US012746660B2

(12) United States Patent
Moyer

(10) Patent No.: US 12,746,660 B2
(45) Date of Patent: Sep. 29, 2026

(54) MOTILE TENSILE TRUSS TENDON STATIC ATTACHMENT

(71) Applicant: Thomas Patrick Moyer, Lagrangeville, NY (US)

(72) Inventor: Thomas Patrick Moyer, Lagrangeville, NY (US)

( * ) Notice: Subject to any disclaimer, the term of this patent is extended or adjusted under 35 U.S.C. 154(b) by 1001 days.

(21) Appl. No.: 18/052,331

(22) Filed: Nov. 3, 2022

(65) Prior Publication Data

US 2024/0151049 A1 May 9, 2024

(51) Int. Cl.
*B25J 9/00* (2006.01)

(52) U.S. Cl.
CPC .................................. *B25J 9/0078* (2013.01)

(58) Field of Classification Search
CPC ....... B25J 9/0075; B25J 9/0078; B66C 13/06; B66C 13/08; B66C 21/00; B66D 1/36–39; F16G 11/00
See application file for complete search history.

(56) References Cited

U.S. PATENT DOCUMENTS 1,275,395 A * 8/1918 Corbett .................... B66D 1/36 254/389
1,712,478 A * 5/1929 Monroe ................... B66D 3/06 254/394
5,048,703 A * 9/1991 Tax ....................... B66C 13/063 212/319
5,440,476 A * 8/1995 Lefkowitz ............ G05B 19/251 376/310
5,585,707 A * 12/1996 Thompson ................. B25J 5/00 405/188
6,457,792 B1 * 10/2002 Saund ................... B43L 13/024 33/18.1
7,395,609 B2 * 7/2008 Powell ................... G01B 5/008 33/763
2016/0001443 A1 * 1/2016 Davis ..................... A63G 31/16 74/490.08

FOREIGN PATENT DOCUMENTS

WO WO-2021048466 A1 * 3/2021 ............ F16G 11/048

* cited by examiner

*Primary Examiner* — Anna M Momper
*Assistant Examiner* — Nathaniel L Adams

(57) ABSTRACT

Static tendon attachments for motile tensile truss appliances are described which are simultaneously economic and support full undiminished service lifespans. These attachments impose compliant tendon bending over a substantial curvature, wherein the bending of a tendon follows an in-plane changing direction aligned to a tendon paired non-static pulley or sheave attachment. Attachments for trusses which have platforms which move extensively in three dimensions are described which have only a single rotating axis. Attachments for trusses which have platforms which move linearly, or in a plane, are described which have no moving parts other than the tendon itself. Attachments are presented for trussed platforms having 6 Degrees Of Freedom (6DOF), such as those useful for house 3D cement printers. Alternate attachments are presented for trussed platforms constrained to planar motion such as drop plotters, and in linear movement trusses such as semiconductor FOUP hoists, anti-sway cranes, and elevators.

18 Claims, 15 Drawing Sheets

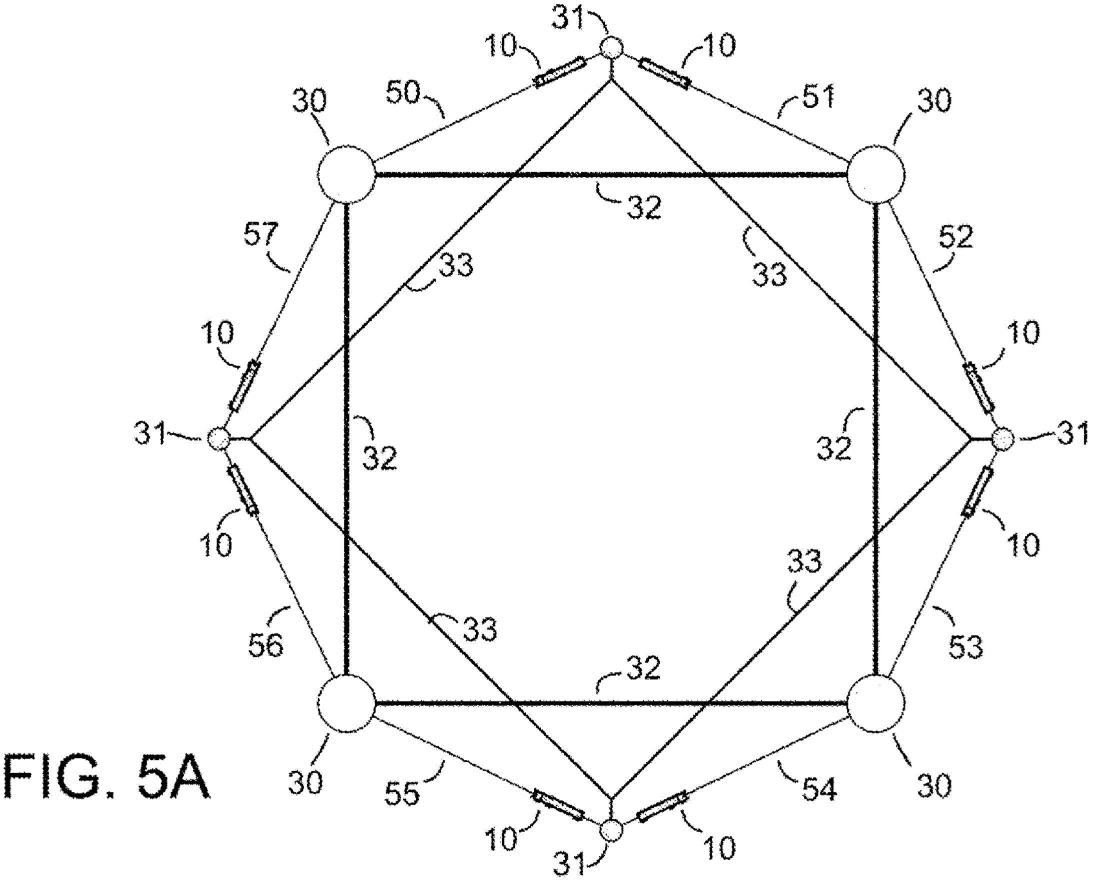
FIG. 5A
FIG. 5B
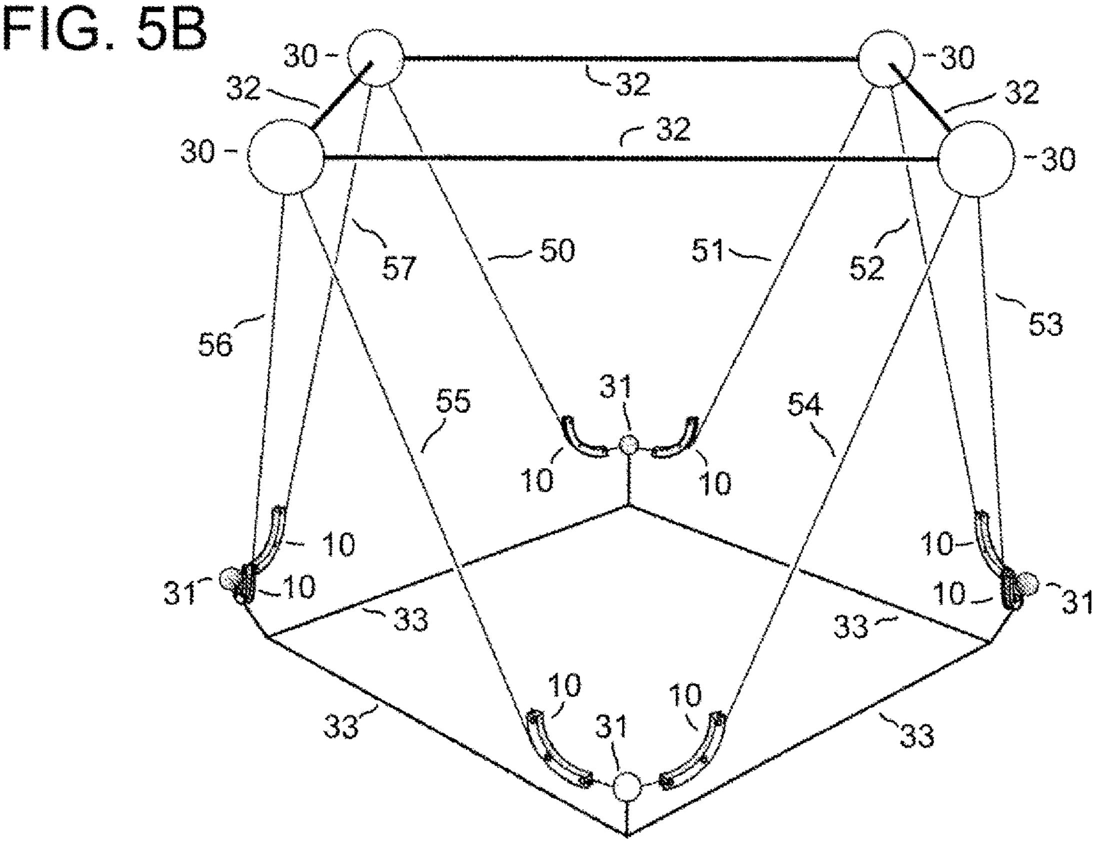

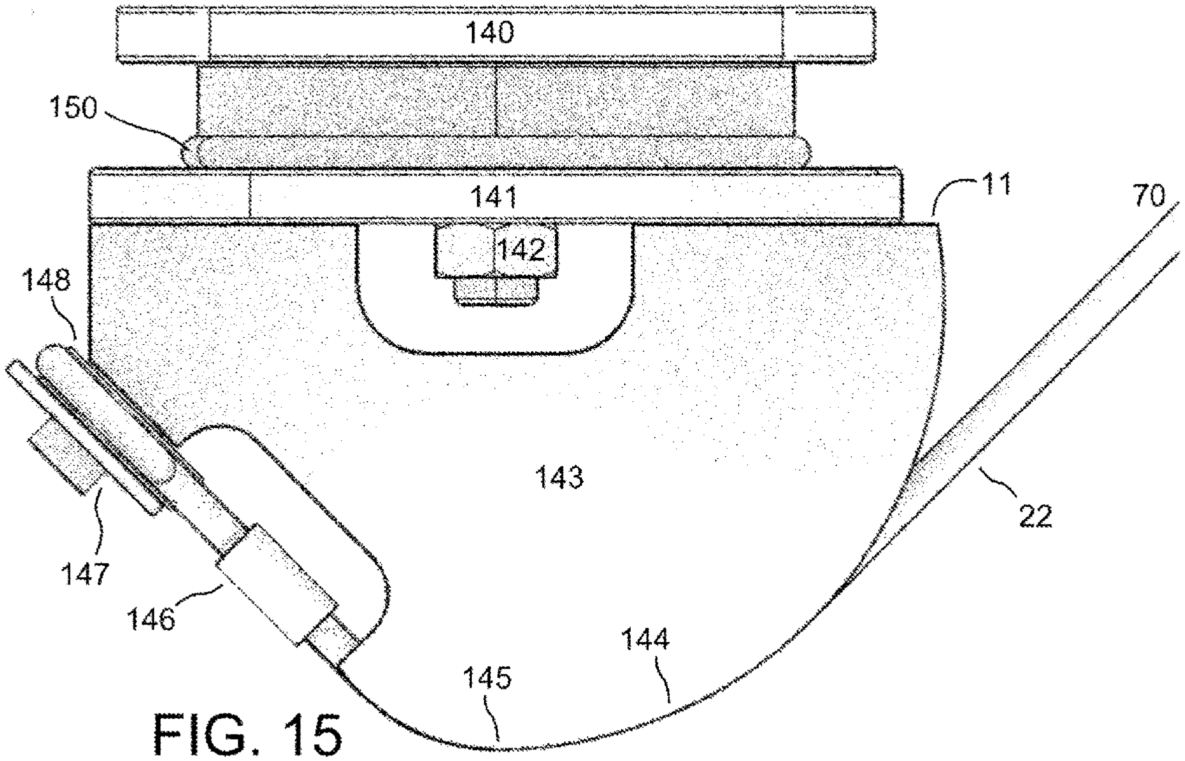
FIG. 15
FIG. 16
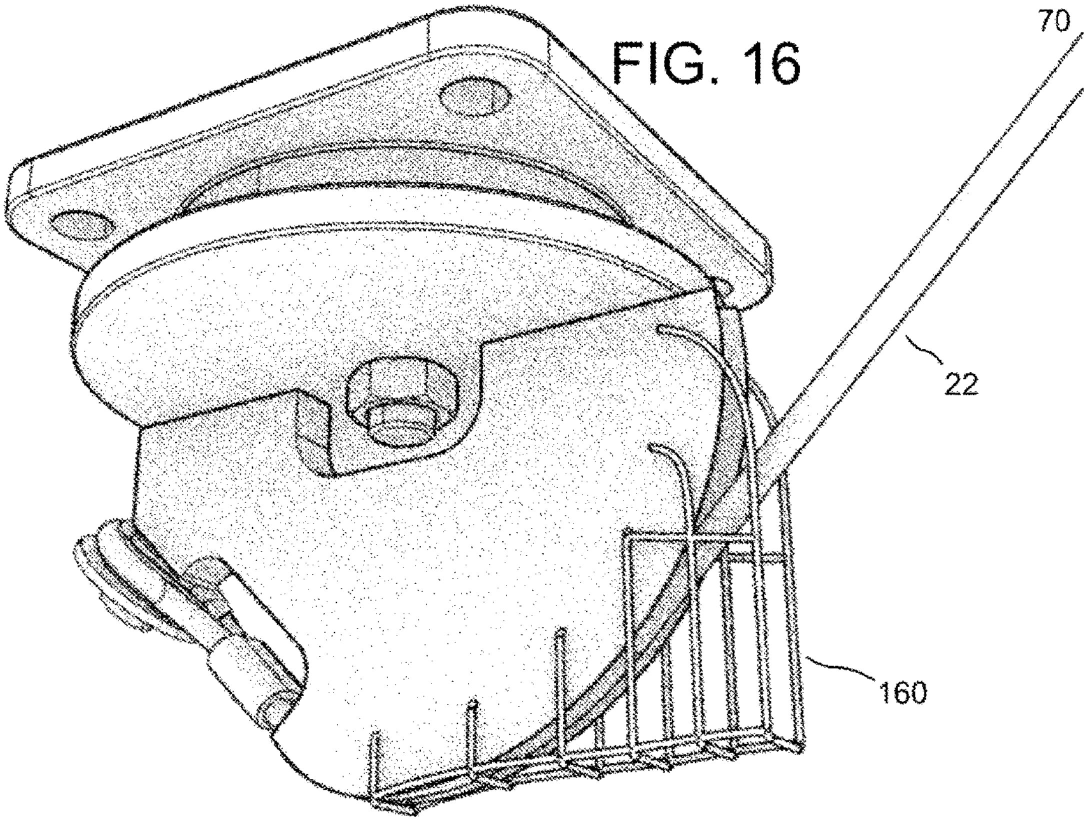

MOTILE TENSILE TRUSS TENDON STATIC ATTACHMENT

REFERENCE TO RELATED PATENTS

| | | | |
|---|---|---|---|
| 2,004,133 | Romano | June | 1935 |
| 2,164,128 | Medenwald | June | 1939 |
| 2,351,727 | Wehr | June | 1944 |
| 2,357,433 | Medenwald | September | 1944 |
| 2,358,487 | Anjeskey | March | 1943 |
| 3,043,444 | Melton | July | 1962 |
| 3,065,862 | Patterson | November | 1962 |
| 3,081,884 | Minty | March | 1963 |
| 3,107,791 | Michael | October | 1963 |
| 3,276,602 | Vogeley | October | 1966 |
| 3,564,533 | Linn | February | 1971 |
| 3,567,040 | Thomson | March | 1971 |
| 3,665,608 | Stockebrand | May | 1972 |
| 3,743,107 | Verschoof | July | 1973 |
| 3,837,503 | Komatsu | September | 1974 |
| 3,842,986 | Hupkes | October | 1974 |
| 3,874,516 | Watanabe | April | 1975 |
| 3,899,083 | Flessner | August | 1975 |
| 3,945,504 | Wright | March | 1976 |
| 3,971,478 | Matasa | July | 1976 |
| 4,076,127 | Hupkes | February | 1978 |
| 4,135,628 | Harris | January | 1979 |
| 4,168,857 | Kloos | September | 1979 |
| 4,412,383 | Landa | November | 1983 |
| 4,531,647 | Higuchi | July | 1985 |
| 4,583,292 | Langberg | April | 1986 |
| 4,705,180 | Lamer | November | 1987 |
| 4,759,658 | Manor | July | 1988 |
| 4,813,146 | Jaluzot | March | 1989 |
| 4,883,184 | Albus | November | 1989 |
| 4,918,817 | Eaton | April | 1990 |
| 4,932,541 | Belsterling | June | 1990 |
| 4,949,855 | Foit | August | 1990 |
| 4,953,721 | Foit | September | 1990 |
| 4,979,093 | Laine | December | 1990 |
| 5,150,799 | Long | September | 1992 |
| 5,186,342 | Shimizu | February | 1993 |
| 5,257,891 | Baumann | November | 1993 |
| 5,408,407 | Lefkowitz | April | 1995 |
| 5,440,476 | Lefkowitz | August | 1995 |
| 5,507,596 | Bostelman | April | 1996 |
| 5,549,413 | Bolden | August | 1996 |
| 5,585,707 | Thompson | December | 1996 |
| 5,638,656 | Roe | June | 1997 |
| 5,660,019 | Roe | August | 1997 |
| 5,765,703 | Shiwaku | June | 1998 |
| 6,021,911 | Glickman | February | 2000 |
| 6,026,545 | Duggan | February | 2000 |
| 6,102,372 | Gersemsky | August | 2000 |
| 6,126,023 | Durrant-Whyte | October | 2000 |
| 6,129,396 | Asada | October | 2000 |
| 6,145,680 | Jussila | November | 2000 |
| 6,182,843 | Tax | February | 2001 |
| 6,343,702 | Masumoto | February | 2002 |
| 6,367,901 | Saund | April | 2002 |
| 6,367,902 | Saund | April | 2002 |
| 6,368,002 | Saund | April | 2002 |
| 6,382,437 | Okada | May | 2002 |
| 6,439,407 | Jacoff | August | 2002 |
| 6,457,792 | Saund | October | 2002 |
| 6,566,834 | Albus | May | 2003 |
| 6,578,825 | Brandt | June | 2003 |
| 6,644,486 | Jacoff | November | 2003 |
| 6,648,102 | Bostelman | November | 2003 |
| 6,809,495 | Rodnunsky | October | 2004 |
| 6,826,452 | Holland | November | 2004 |
| 6,840,127 | Moran | January | 2005 |
| 6,975,089 | Rodnunsky | December | 2005 |
| 7,040,496 | Hakala | May | 2006 |
| 7,044,426 | Allmon | May | 2006 |
| 7,088,071 | Rodnunsky | August | 2006 |
| 7,150,366 | Zakula | December | 2006 |
| 7,150,367 | Dehm | December | 2006 |
| 7,239,106 | Rodnunsky | July | 2007 |

-continued

REFERENCE TO RELATED PATENTS

| | | | |
|---|---|---|---|
| 7,246,445 | Thallner | July | 2007 |
| 7,267,240 | Maurer | September | 2007 |
| 7,284,744 | Lerchenmueller | October | 2007 |
| 7,287,740 | Reyes | October | 2007 |
| 7,367,464 | Agostini | May | 2008 |
| 7,392,914 | Sorsa | July | 2008 |
| 7,392,915 | Sorsa | July | 2008 |
| 7,395,609 | Powell | July | 2008 |
| 7,407,150 | Bellantoni | August | 2008 |
| 7,575,214 | Badalament | August | 2009 |
| 7,753,642 | Bosscher | July | 2010 |
| 7,950,539 | Henriksson | May | 2011 |
| 7,963,505 | Taylor | June | 2011 |
| 7,984,534 | Duggan | July | 2011 |
| 8,157,205 | McWhirk | April | 2012 |
| 8,708,172 | Kim | April | 2014 |
| 8,920,251 | Dietz | December | 2014 |
| 8,978,831 | Shilpiekandula | March | 2015 |
| 9,010,733 | Kwon | April | 2015 |
| 9,048,779 | Szarzynski | June | 2015 |
| 9,238,569 | Sorensen | January | 2016 |
| 9,457,473 | Rudakevych | October | 2016 |
| 9,533,861 | Esteban | January | 2017 |
| 9,597,795 | Herder | March | 2017 |
| 9,834,418 | Gerard | December | 2017 |
| 9,868,596 | Worsley | January | 2018 |
| 9,908,750 | Sturm | March | 2018 |
| 9,950,910 | Sorensen | April | 2018 |
| 9,964,836 | Bennett | May | 2018 |
| 10,016,891 | Reid | July | 2018 |
| 10,036,487 | Duggan | July | 2018 |
| 10,112,118 | Davis | October | 2018 |
| 10,189,076 | Peters | January | 2019 |
| 10,214,304 | Kwon | February | 2019 |
| 10,321,754 | McCaughey | June | 2019 |
| 10,427,919 | Rodriguez | October | 2019 |
| 10,449,668 | Yang | October | 2019 |
| 10,471,590 | Vachon | November | 2019 |
| 10,494,233 | Sturm | December | 2019 |
| 10,611,608 | Fenger | April | 2020 |
| 10,676,327 | Staudecker | June | 2020 |
| 10,688,401 | Brister | June | 2020 |
| 10,737,915 | Mohr | August | 2020 |
| 10,807,837 | Beer | October | 2020 |
| 10,843,882 | Worsley | November | 2020 |
| 10,941,024 | Khajepour | March | 2021 |
| 11,040,288 | Brister | June | 2021 |
| 10,941,024 | Khajepour | March | 2021 |
| EP2578367A1 | Collado | October | 2013 |

TECHNICAL FIELD OF THE INVENTION

The present invention relates to elements of load engaging cranes minimizing or preventing longitudinal or transverse swinging of loads. It also relates to machines, apparatus or tools for artistic and industrial work: tools for carving. These carving machines are both those able to be controlled three-dimensionally, and those controlled substantially two-dimensionally.

BACKGROUND OF THE INVENTION

Motile tensile trusses have extensive and longstanding application as displacement resisting and rotation resisting means in load suspension appliances with an exemplary example as the 1935 U.S. Pat. No. 2,004,133 of Romano. The force against which the suspension occurs is most often gravity, with buoyancy and centripetal force also being sources of suspension force. These environmental unidirectional forces are hereafter referred to as the environment. Alternately, a truss can have only those forces which substantially participate in suspending the platform being opposition-ally imposed forces conveyed by the tendons themselves, with an exemplary example as the 1983 U.S. Pat. No. 4,412,383 of Landa. A truss can also be a mixed mode truss with significant suspension forces arising from the environment and from the truss tendons.

The following paragraphs are definitions of exemplary terms used within this disclosure. Except where noted otherwise, variants of all terms, including singular forms, plural forms, and other affixed forms, fall within each exemplary term meaning. Except where noted otherwise, capitalized and non-capitalized forms of all terms fall within each meaning.

A tensile trusses is defined as an appliances as has a frame and a platform suspended therefrom by tendons, said platform having an equilibrium location and orientation imposed by only the appliance environment and two or more tendons spanning between frame attachments and platform attachments, the tendons having a geometrical relationship one to each other, such that any application imposed force on the platform results in an equilibrium platform displacement and platform reorientation, both relative to the frame, with no less than half of the imposing force accommodated by axial elastic deformation of the tendons.

A motile tensile truss is defined as a tensile truss with means for the platform to change either position relative to the frame, or to change orientation relative to the frame, or to change both position and orientation relative to the frame.

A planar tensile truss is defined as a tensile truss with a planar restraining body against which the platform is juxtaposed.

A motile planar tensile truss is defined as a planar tensile truss with means for the platform to change either position relative to the frame, or to change orientation relative to the frame, or to change both position and orientation relative to the frame.

Tendons are defined as mechanical elements which are long, thin, and able to resist substantial tensile force by elastic stretching deformation. They are much less able to resist transverse forces exhibiting relatively easy bending. They are nearly or completely unable to withstand compression forces, going slack and bending instead of stiffly resisting. Tendons in the highest load applications are commonly wire ropes which are also known as twisted multi-strand steel cables. Tendons in lower force applications can be ropes, cords, tapes, belts, strings, fibers, threads, filaments, and other long thin axially extensively resistant, transversely and compressively compliant members. These latter are often entirely polymeric, but can also be reinforced with, or composed entirely of, fiberglass and/or metal.

A truss attachment is defined as a mechanical elements against which a truss tendon exerts mechanical force, and through which said mechanical force is transformed from the nearly purely tensile force in the portion of the tendon spanning the gap between the platform and the frame, to become forces acting on the frame or platform to which they are juxtaposed.

A slack tendon is defined as a tendon which conveys only the force derived from the tendons own weight to the frame attachment and to the platform attachment. A tendon becoming slack can result in the tendon loosing contact with an attachment. Slack tendons generally do not occur during normal motile tensile truss operations. Slack tendons occur during initial truss setup, when truss platforms are docked or are out-of-service, and during truss operation error states.

The attachments against which the tendons are reeved consist of sheaves, and pulleys which are active attachments, or static attachments. Active attachments have the tendon move axially relative to the attachment and are associated with the live end of a tendon. The live end of the tendon is that end against which motive force is exerted to cause motion in a motile tensile trusses. Static attachments have no axial motion of the tendon relative to the attachment and are associated with the dead end of a tendon in motile tensile tresses. The present invention is an improved embodiment of static attachments for motile tensile trusses.

There are three broadly applied motile tensile truss static attachment types in the prior art, grinding, single axis rotary, and orthogonal double axis rotary. Those motile trusses as are restricted to substantially linear motion of the platform relative to the frame have one additional reeving tactic for terminal tendon static attachment. The tendon can be reeved over an angle accommodating pulley, and then be directed back through the frame-to-platform gap along a path parallel to the platform motion, at which point the tendon makes a non-angle-accommodating static attachment. The present invention is superior to each of these prior arts, with the particulars enumerated below.

An aspect of all tensile trusses is that: one or more of the tendons must be inclined at an angle to the sum of the forces exerted on platform by the environment and the other tendons. Without this inclination, a platform would respond to application forces from many directions with pendulant swinging and/or rotating motions without significant accommodative tendon axial elastic deformation, and would thus not to conform to the truss definition.

An aspect of all motile tensile trusses is that the angle of tendon inclination, to both the platform and the frame, change for at least one tendon, for any change in displacement or rotation of the platform relative to the frame.

The extensive use of wire rope tendons to support overhead loads in cranes and to support people in elevator and ski lift applications has prompted extensive characterization of the use limits, load limits, the inspections required, and the frequency of inspections required for safe, extended, and economic service life. These efforts have transformed the degradation limitation of trussed applications from the historic tendon failures, to pre-failure service life reduction. Two application design considerations have emerged as required to avoid service life reduction: Avoidance of tight curvature tendon deformation, and avoidance of excessive fleet angles on transversely restraining attachments. Wire rope tendon curvatures in the US and Europe are required to have the diameter of sheaves and pulleys to be 18 and 24 times as large respectively, as the tendon diameter. Sheave and pulley vendors have characterized the service life dependencies for multiple cable configurations of wire strands and wire strand bundles. These vendors routinely recommend cable strand and cable strand bundle dependent curvatures larger than the required minimums. Acceptable fleet angles have been characterized as dependent on the sidewall geometry of the transversely restraining recess, with fleet angles less than 1.5 degrees acceptable for recesses having a 45 degree opening, and fleet angles of less than 4 degrees acceptable for recesses having a 60 degree opening. The present invention is conformal to these functional requirements.

The present invention is superior to the grinding type attachment in supporting the tendon service lifetimes required by modern practice and regulation. Early proposals such as U.S. Pat. No. 2,004,133 of Romano June 1935 depict eye bolts with cables making angular adjustments by having thimbles exceed their static friction limits, and jumping to a new location on the eye bolt under high load concentrations.

This wears both the eye bolt and the cable thimble giving short service life. The lower cost alternative to eye bolts proposed in U.S. Pat. No. 6,026,545 Duggan February 2000 acknowledges this incompatibility of grinding type tendon attachments to motile attachment angle modifying tendon truss application requirements by claiming and disclosing only applications in which the tendons do not change their orientation to the disclosed universal restraint clip fitting.

The present invention is superior to the single axis rotary and the orthogonal double axis rotary in supporting the same long tendon service lifespan at lower cost. This cost differential is achieved by replacing one rotary axis having moving parts, with an attachment wherein the only moving part is already present tendon bending over a curvature. For the single rotary axis applications the present invention eliminates the single rotary axis. For orthogonal double rotary axis applications the present invention eliminates one of the two rotary axis. The replacement of a moving part with a static, non-moving part has lower initial cost, and reduced maintenance costs.

For some applications such as semiconductor Front Opening Universal Pod (FOUP) truss supported linear motion hoist systems, the elimination of moving parts has additional cost benefits from elimination of the contamination exposures associated with lubricants. The lubricants required for the rotary bearing represents a contamination exposure, both as a volatilizing material itself, and as an attractant and retentive substance for particulates which can later be released at times and locations of wafer exposure.

The linear motion truss reeving tactic of spanning the frame-to-platform gap with a tendon parallel to the axis of linear motion requires a pulley as the tendon attachment most proximal to the tendon termination. This pulley, with it's attendant initial expense and ongoing maintenance costs, is eliminated by use of the present invention, thus providing for a lower cost solution.

BRIEF DESCRIPTION OF THE FIGURES

FIGS. 5A and 5B are schematic isometric and perspective representations respectively, of a linear motion quadrilateral polyhedral truss.

FIG. 15 is an isometric view of the attachment in FIG. 14.

FIG. 16 is a perspective view of a wire mesh cage type tendon guide added to the attachment of FIG. 14.

DETAILED DESCRIPTION OF THE FIGURES

Figure 1:
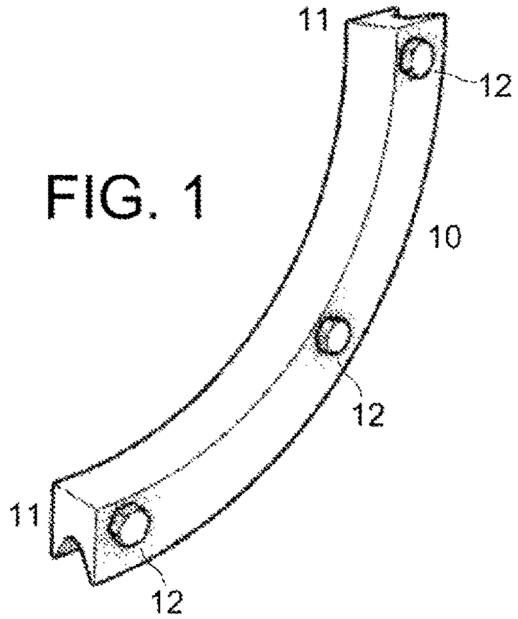
FIG. 1 is an exemplary form of an attachment.

FIG. 1 shows an exemplary embodiment of an attachment 10 which has a cross section 11 of a standard wire rope pulley. This cross section has a radius slightly larger than the equiaxed cross section of the tendon extending, said radiused portion extending less than half of the tendon diameter. The radiused section gives way to a straight angled portion, which serves to guide the tendon into the radiused recess. Three bolts 12 are shown indicating that the attachment is a static tendon reeving element.

FIG. 2 shows cross sections of several embodiments of the present invention. FIGS. 2A and 2B depict standard pulley cross sections, supporting multi strand wire rope 22. The angle 24 is 60 degrees and angle 25 is 45 degrees. The angle 24 supports fleet angles of up to 4 degrees, whereas angle 25 supports fleet angles of only up to 1.5 degrees before service life foreshortening occurs. For this reason, FIG. 2A is the most preferred cross section for tendons with round or approximately round cross sections.

Figure 2A:
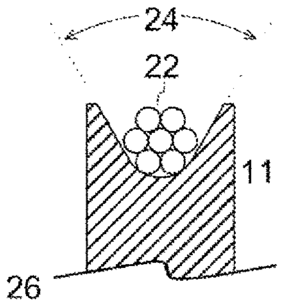
FIGS. 2A, 2B, 2C, 2D, and 2E are cross sections of several attachment embodiments.
Figure 2B:
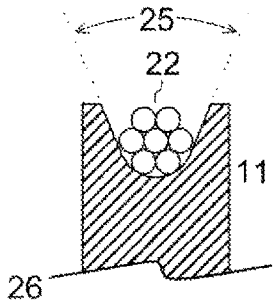
Figure 2C:
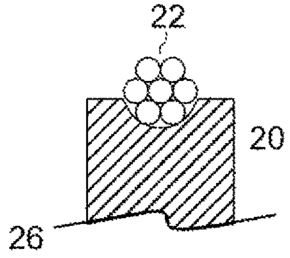
Figure 2D:
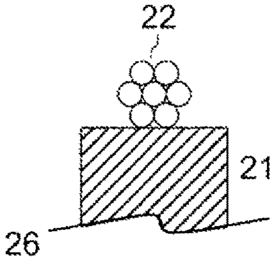
Figure 2E:
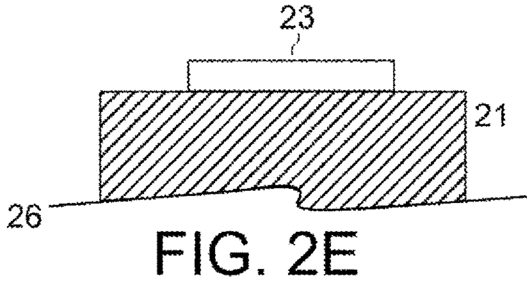

Section indeterminate extent 26 depicts that the extent of the attachment can vary, having a relatively thin distance as in attachment 10, or extending completely to fill the area subtended by the tendon curvature, as depicted in FIG. 8. FIG. 2C has the equiaxed multifilament wire rope tendon 22 in a recess, without angled guides. FIGS. 2D and 2E show attachments which have non-recessed curvature surfaces against which the tendon bears. In the case where extent 26 is the full radius of the curvature, FIGS. 2D and 2E would be right circular cylinders. In the case where the extend 26 is relatively modest, FIGS. 2D and 2E would be flat rimmed wheels. FIG. 2E is the most preferred cross section for a non-equiaxed tendon 23 conforming to the tape, band, or belt type tendon description.

Figure 3A:
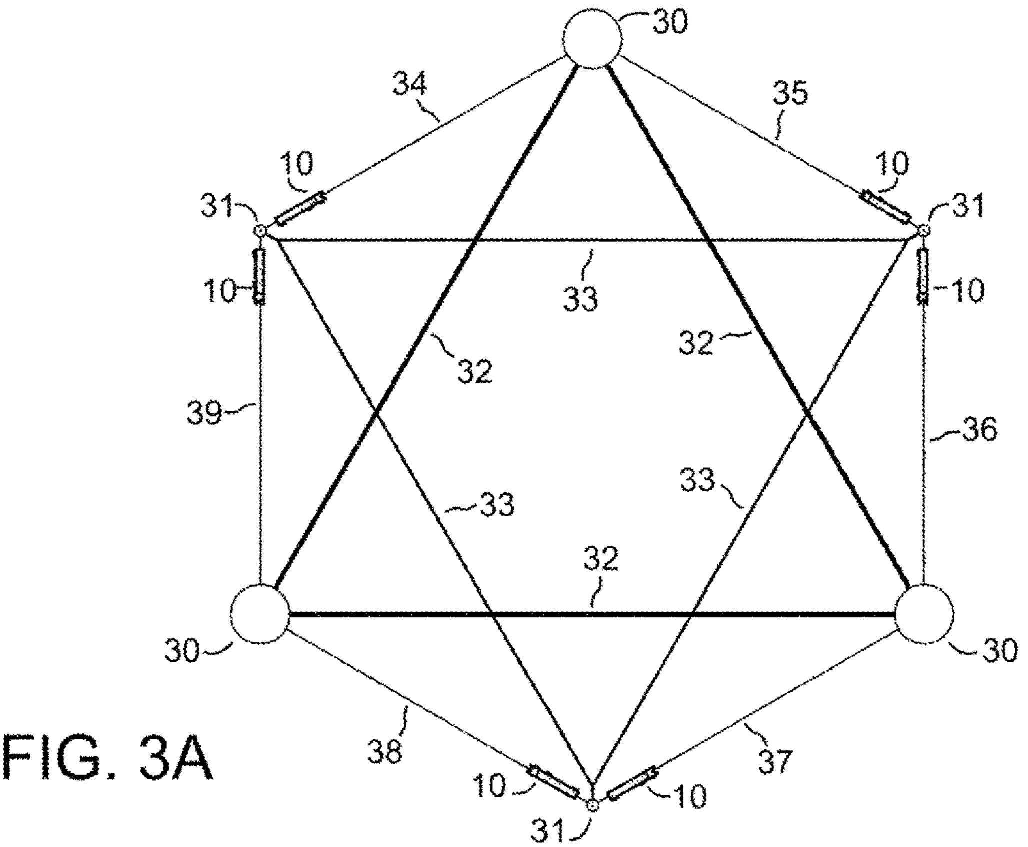
FIGS. 3A and 3B are schematic isometric and perspective representations respectively, of a linear motion triangular polyhedral truss.

FIG. 3A is a top down isometric schematic representation of a trigonal polyhedral linear motion truss. Trigonal because the frame and the platform are triangles. Polyhedral because the three frame 32 bars, the three platform 33 bars, and the 6 tendons 34 to 39, form an octahedron. The anti-alignment of the frame and platform bars gives rise to a 6 pointed star when viewed orthogonal to the direction of platform motion. The tendons 34 to 39 each span between a static attachment of the present invention 10, and a symbolic active tendon span ending unit 30. These active units 30 are able to retract or extend tendon to decrease or extend respectively the distance between the frame and platform. In real world trusses they are often motorized multi wrap sheaves. They can alternately be pulleys with the tendon being reeved there-over to distal take-up pay-out means. The tendons are each dead end at a symbolically represented strain relieving termination 31.

Figure 4A:
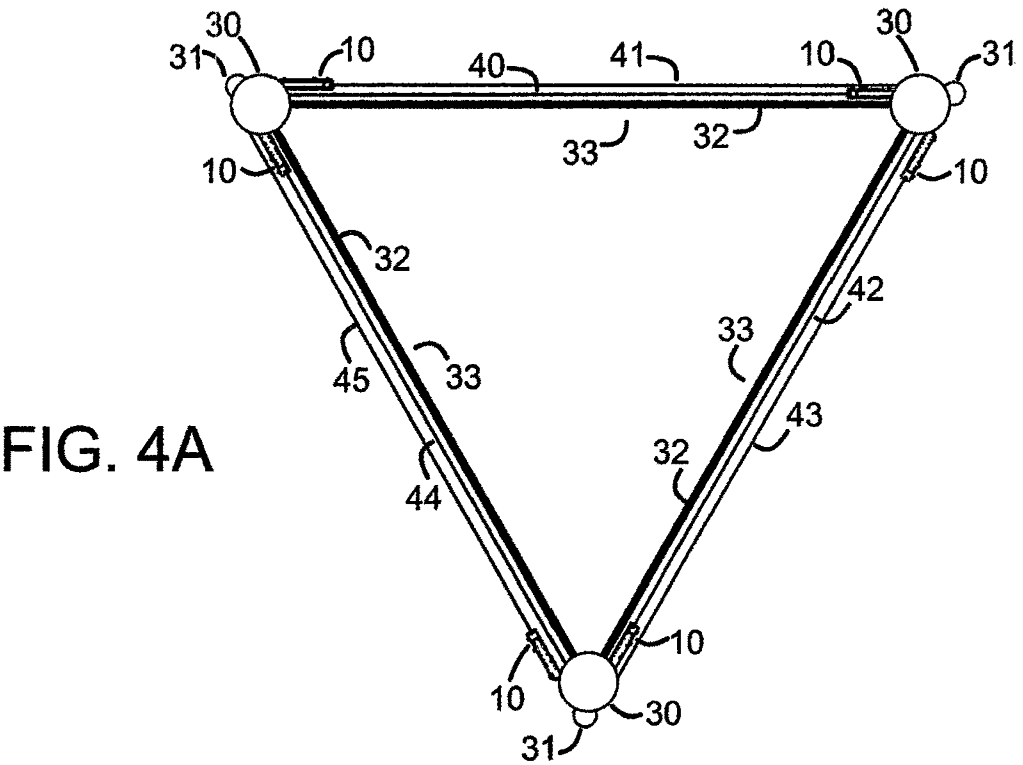
FIGS. 4A and 4B are schematic isometric and perspective representations respectively, of a linear motion triangular prismatic truss.
Figure 4B:
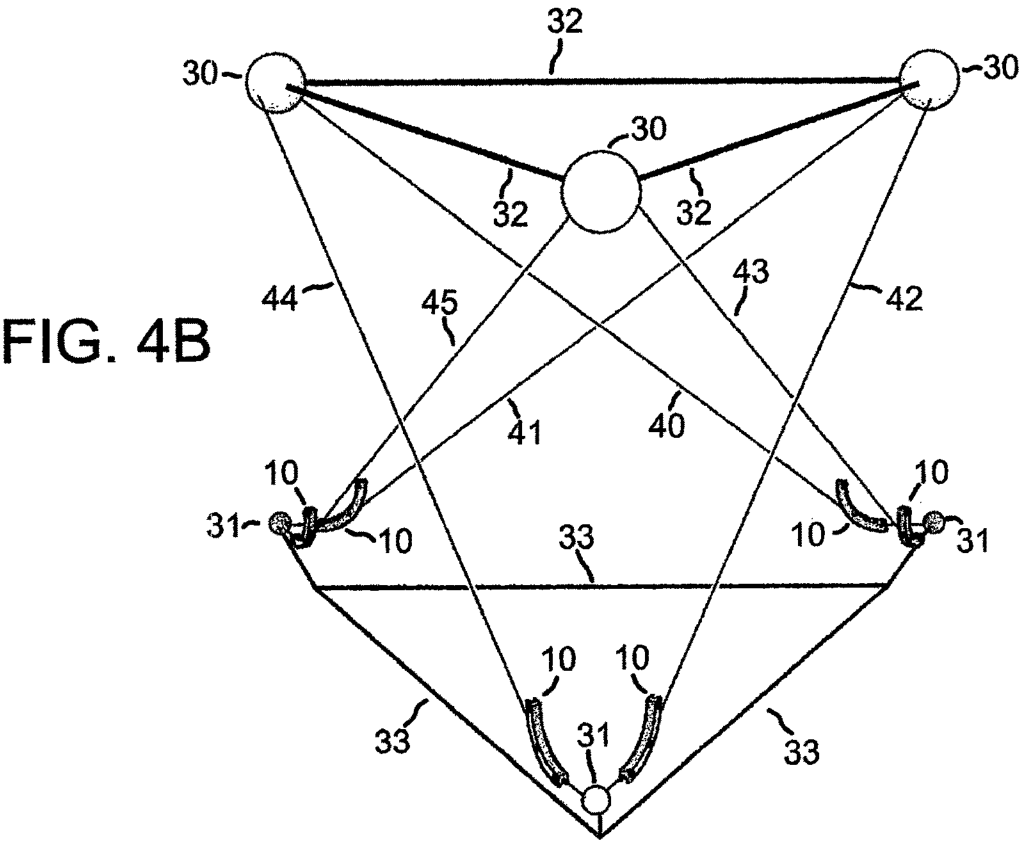

FIG. 4A is a top down isometric schematic representation of a trigonal prismatic linear motion truss. Trigonal because the frame and the platform are triangles. Prismatic because the three frame 32 bars, the three platform 33 bars, and the 6 tendons 40 to 45, form the shape of a prism.

Figure 3B:
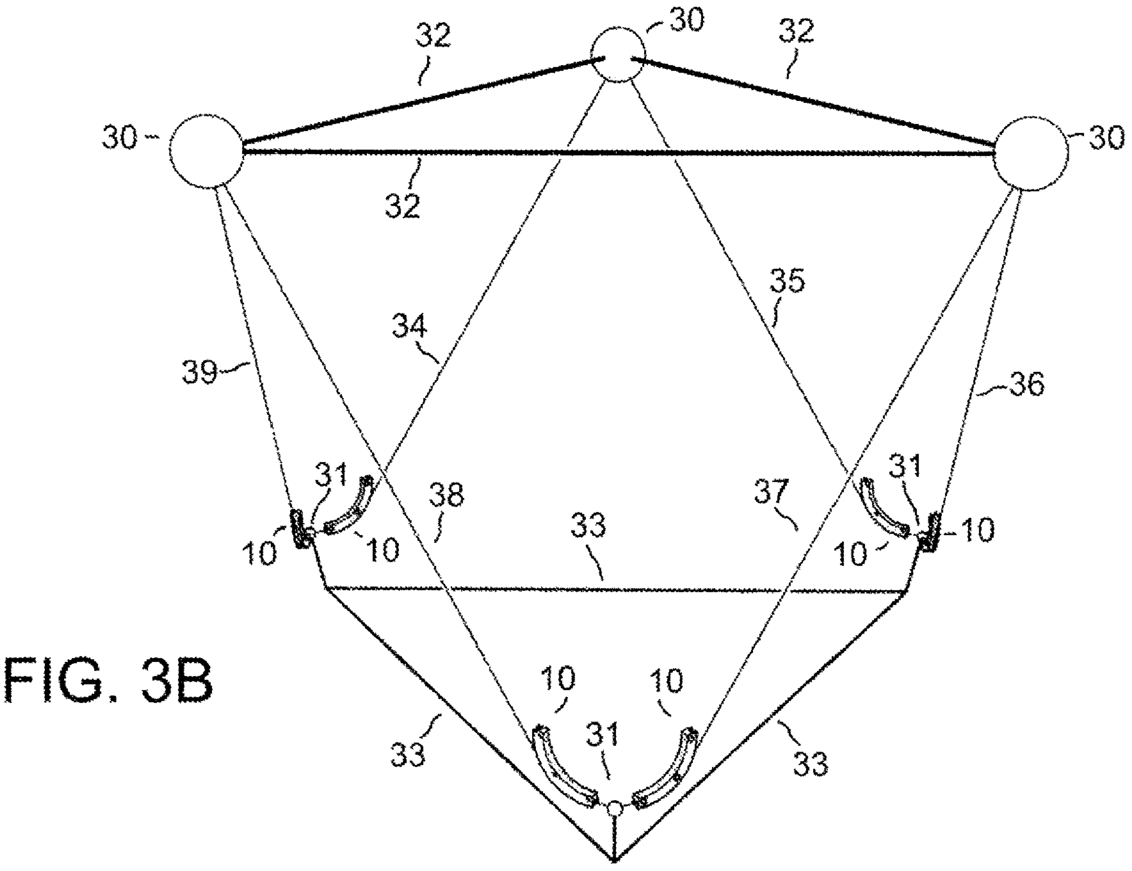

The tendons extending from the two ends of any frame bar 32 or any platform bar 33 are nearly co-planar, being offset by only enough to avoid the two tendons rubbing against each other. Active units 30, attachments 10, and strain relieving dead end terminations 31, provide the same functions as in FIGS. 3A and 3B.

FIG. 5A is a top down isometric schematic representation of a quadrilateral polyhedral linear motion truss. Quadrilateral because the frame and the platform are quadrilaterals. Polyhedral because the four frame 32 bars, the four platform 33 bars, and the 8 tendons 50 to 57, form an shape with more sides than the prismatic form. The anti-alignment of the frame and platform bars gives rise to a 8 pointed star when viewed orthogonal to the direction of platform motion. Active units 30, attachments 10, and strain relieving dead end terminations 31, provide the same functions as in FIGS. 3A and 3B.

Figure 6A:
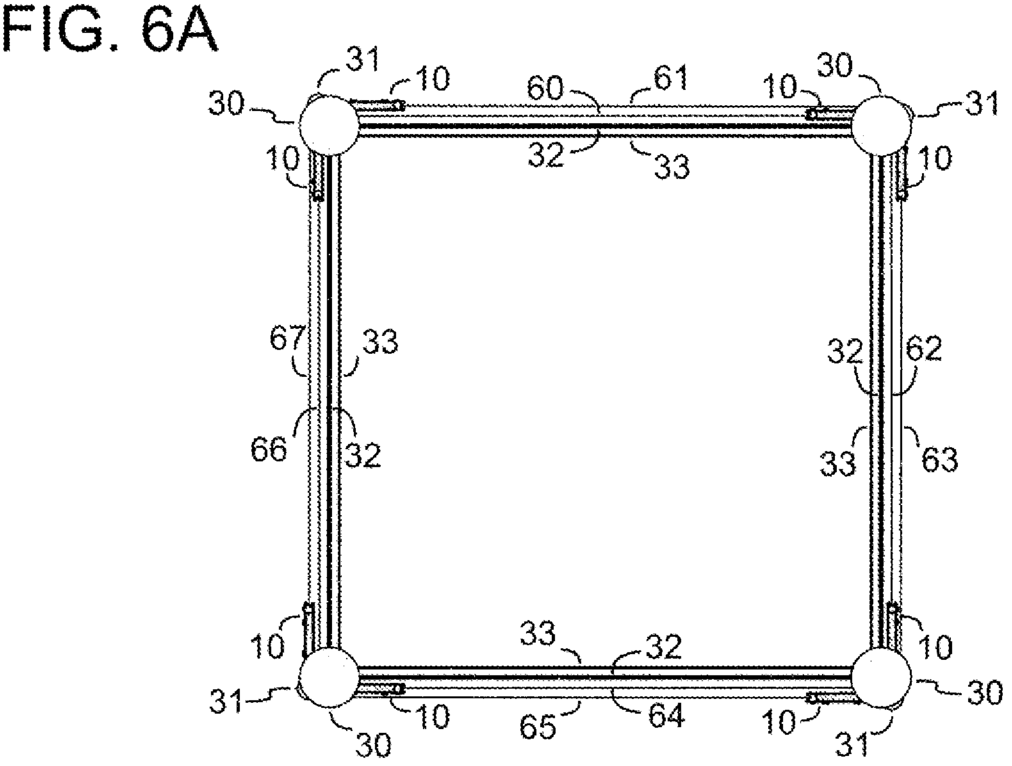
FIGS. 6A and 6B are schematic isometric and perspective representations respectively, of a linear motion quadrilateral prismatic truss.
Figure 6B:
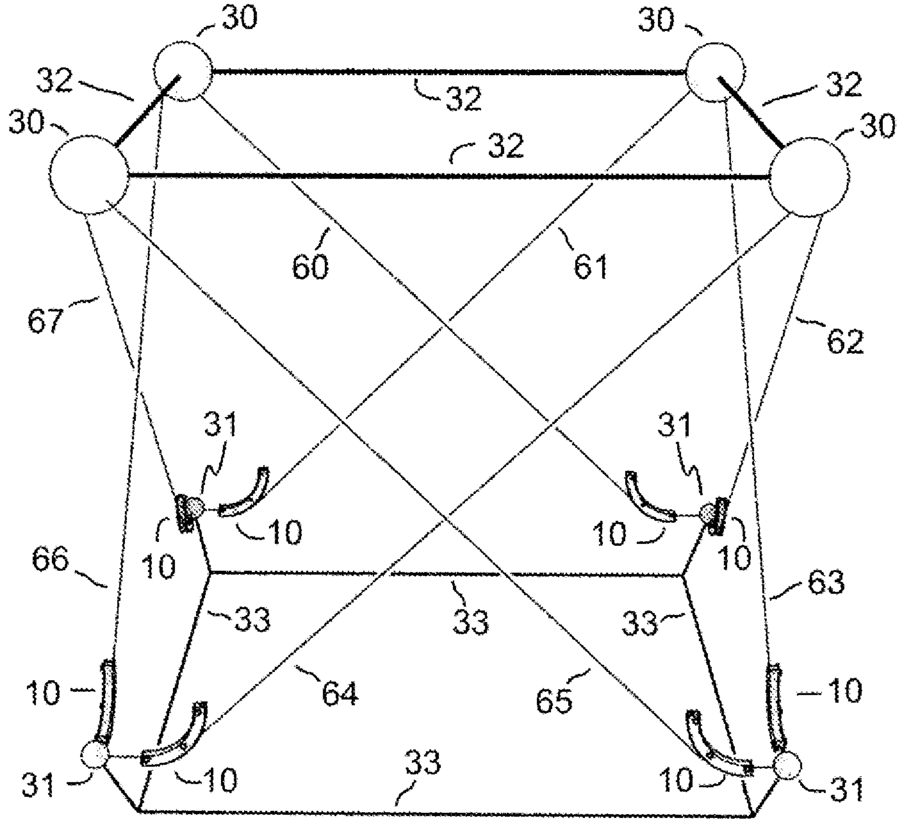

FIG. 6A is a top down isometric schematic representation of a trigonal prismatic linear motion truss. Quadrilateral because the frame and the platform are quadrilaterals. Prismatic because the tendons extending from the two ends of any frame bar 32 or any platform bar 33 are nearly co-planar, being offset by only enough to avoid the two tendons rubbing against each other. These planes are the crystallographic prismatic planes of structure. Active units 30, attachments 10, and strain relieving dead end terminations 31, provide the same functions as in FIGS. 3A and 3B.

Linear motion of the trussed platforms in FIGS. 3 to 6, relative to their frames occurs when the extension or retraction of the tendons occur in a coordinated manner which causes the rotation and orientation of the platform relative to the frame to remain invariant. One aspect of this is that the isometric views 3A, 4A, 5A, and 6A are identical no matter the extent of their platform to frame distances. Those skilled in 3 dimensional geometry will see this as key in understanding why an attachment with curvature in a single plane is functional for linear motion trusses.

Figure 7A:
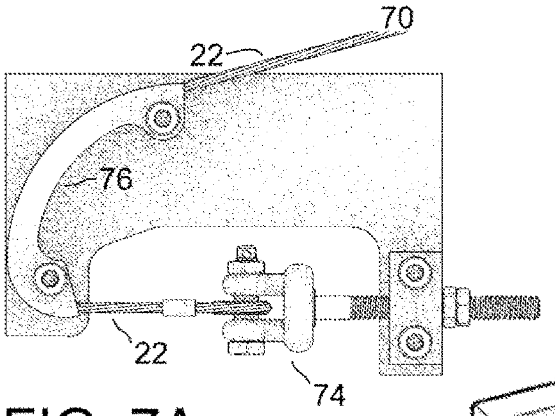
FIGS. 7A and 7B are isometric and perspective views respectively of attachments with one form of tendon dead end strain relieving termination.
Figure 7B:
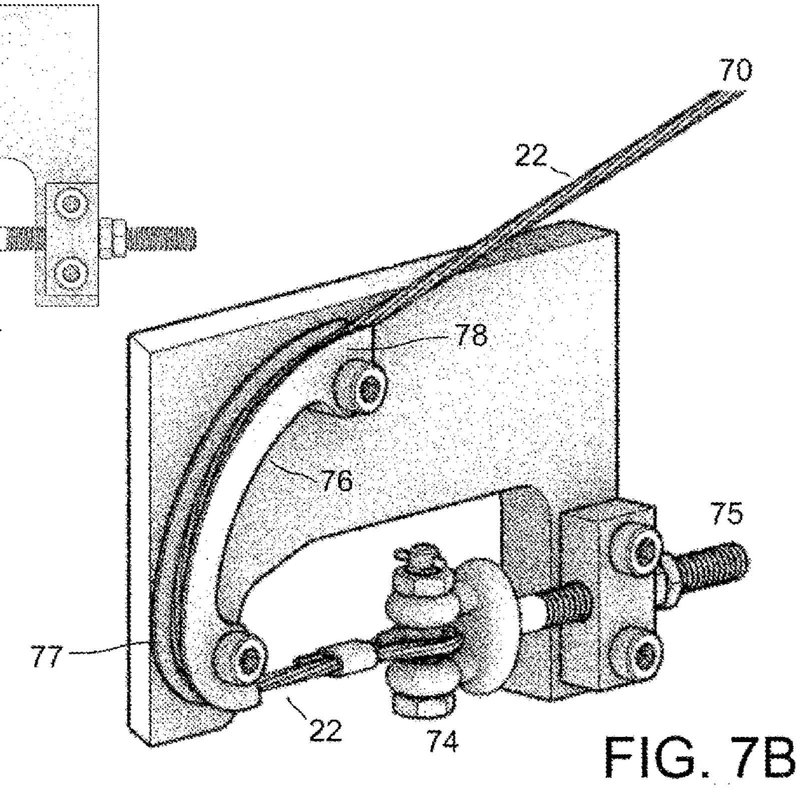

FIGS. 7A and 7B are an isometric side view and a perspective view respectively of an alternate attachment embodiment 76 with a strain relieving termination 74 able to adjust the length of tendon 22 using the threaded rod and nut assembly 75. The tendon is indicated as continuing up toward the active unit at 70. This attachment embodiment of the present invention has the mandated large radius curvature from location 78 to location 77. Location 78 is the contact separation between the attachment and the tendon when the platform is at the closest design separation between frame and platform. Location 78 corresponds to the least vertical inclination of the tendon. Location 77 is the attachment to tendon contact separation when the platform is at the furthest design separation between frame and platform. Location 77 corresponds to the most vertical inclination of the tendon. For sheave type active units 30 (not shown) this tendon-on-top embodiment is not preferred because a greater portion of the tendon rubs against the angled sidewall in the portion of platform motion where the frame and platform are further apart, corresponding to the attachment higher fleet angle portion of the motion range.

Figure 7C:
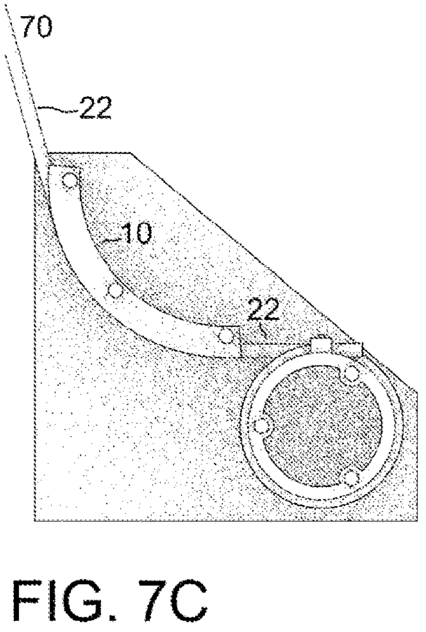
FIGS. 7C and 7D are isometric and perspective views respectively of attachments with another form of tendon dead end strain relieving termination.
Figure 7D:
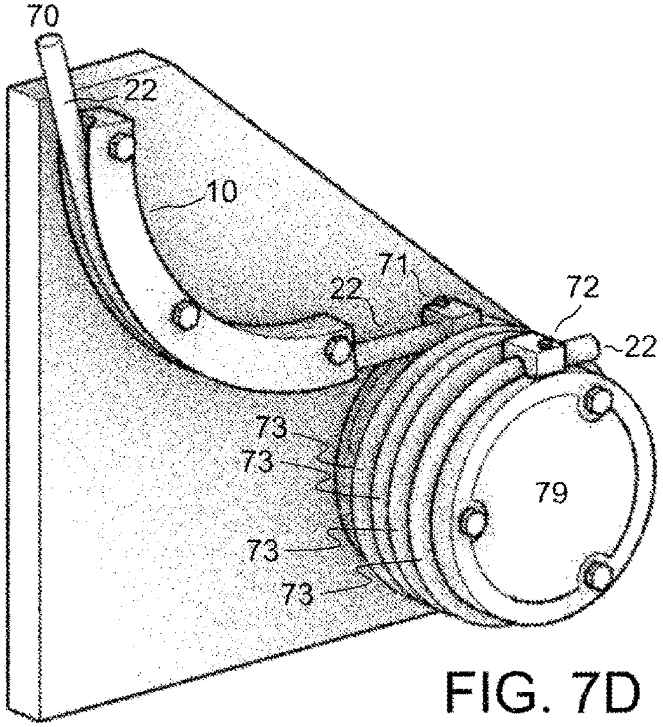

FIGS. 7C and 7D are an isometric side view and a perspective view respectively of the attachment embodiment 10 mounted proximally to an alternate form of strain relieving tendon termination appliance 79. The appliance 79 supports a fairlead 71 which guides the location of the tendon, but allows the tendon to move along the tendon length. The appliance 79 further supports a dead end clamp 72 which imposes enough axial deformation to resist tendon motion. Appliance 79 supports multiple wraps 73 of the tendon to dissipate the tension in the tendon over the body of the appliance, resulting in only small forces needing to be resisted by clamp 72.

As can be seen in FIG. 7D, those applications having tendon 22 comprised of relatively stiff material, such as wire rope, can ensure correct engagement of tendon 22 into attachment 10, by placing strain relieving tendon termination 79 close to attachment 10, and use of fairlead 71 to ensure well aligned tendon 22 egress to attachment 10. Such embodiments can thus foster unaided, automatic recovery from slack tendon 22 conditions.

Figure 8B:
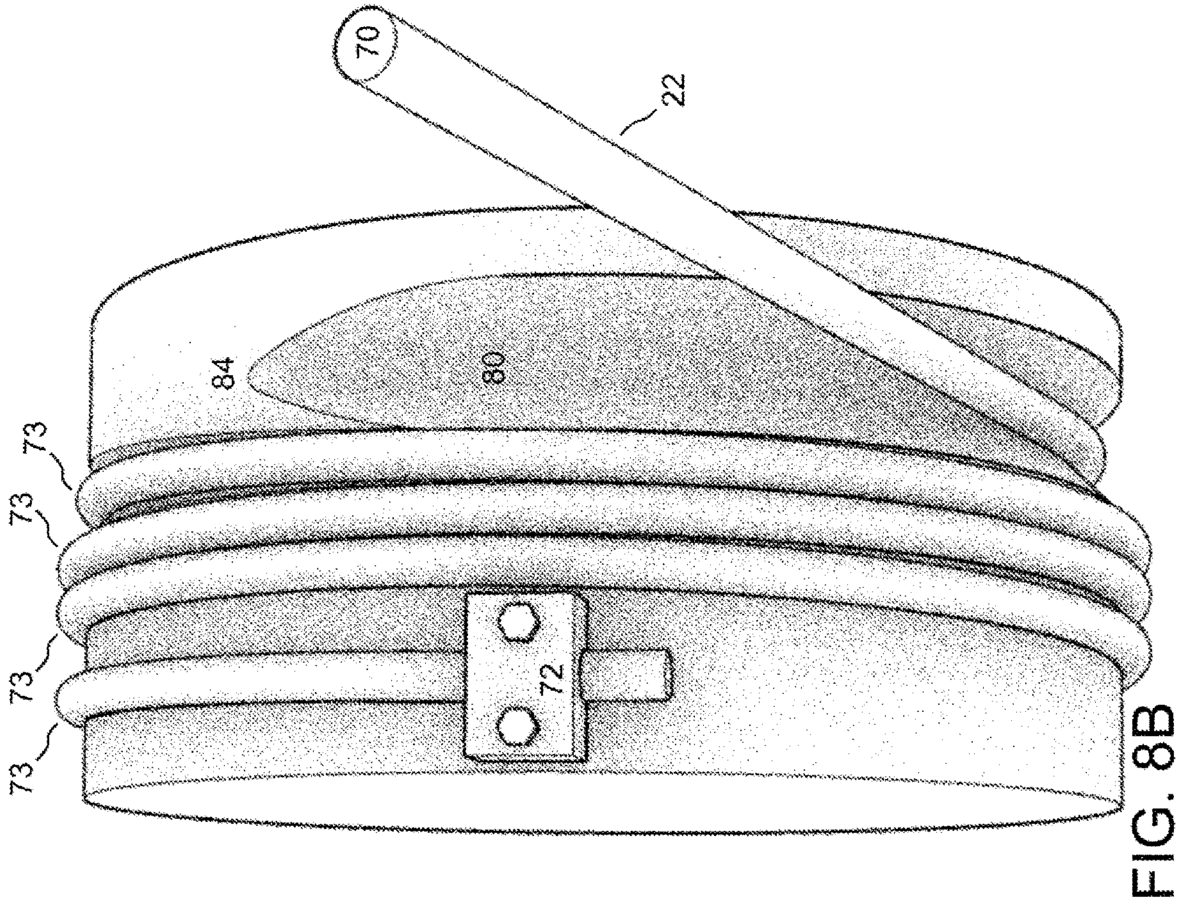
FIGS. 8A and 8B are perspective views of a tendon terminating, self strain relieving attachment without and with a tendon respectively.
Figure 8A:
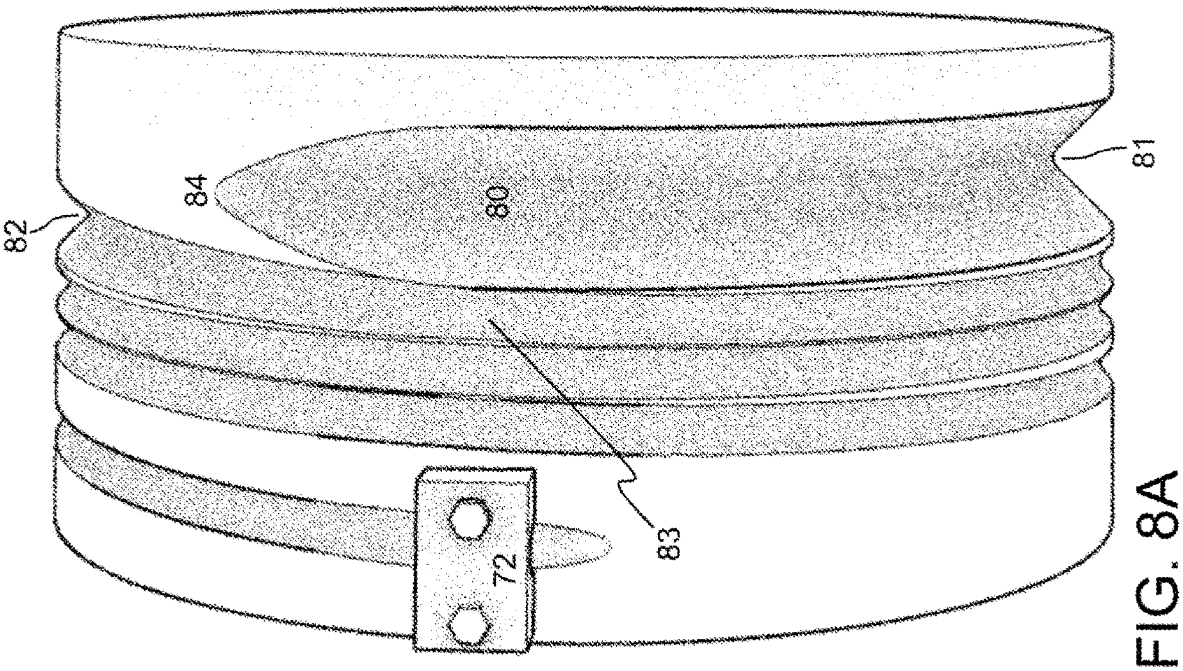

FIG. 8A is a perspective view of a cylindrical embodiment of the present invention which has an integral strain relieving tendon termination, shown without a tendon. FIG. 8B is the same embodiment with tendon 22 in place, said tendon shown here in the least vertical attitude. Location 80 is point at which the last contact between the attachment and the tendon if the tendon were to be completely vertical. The span between 80 and groove exit location 84 is straight, and would support the tendon along the entire 80 to 84 distance, if the tendon were to be vertical. The groove extends 90 degrees around the cylinder, from location 80 to location 81, at single depth which provides the invention mandated gentle curvature over the full range of tendon to attachment contact. The groove continues along the far (not shown) side of the cylinder with a gradual increase in radius through location 82 and continuing to location 83, at which the groove is as shallow as is recommended for a single layer sheave. The groove continues around the attachment to provide a guide for multiple strain relieving wraps 73 of the tendon around the attachment. The groove exits the attachment shortly after directing the cable through clamp 72.

Figure 9A:
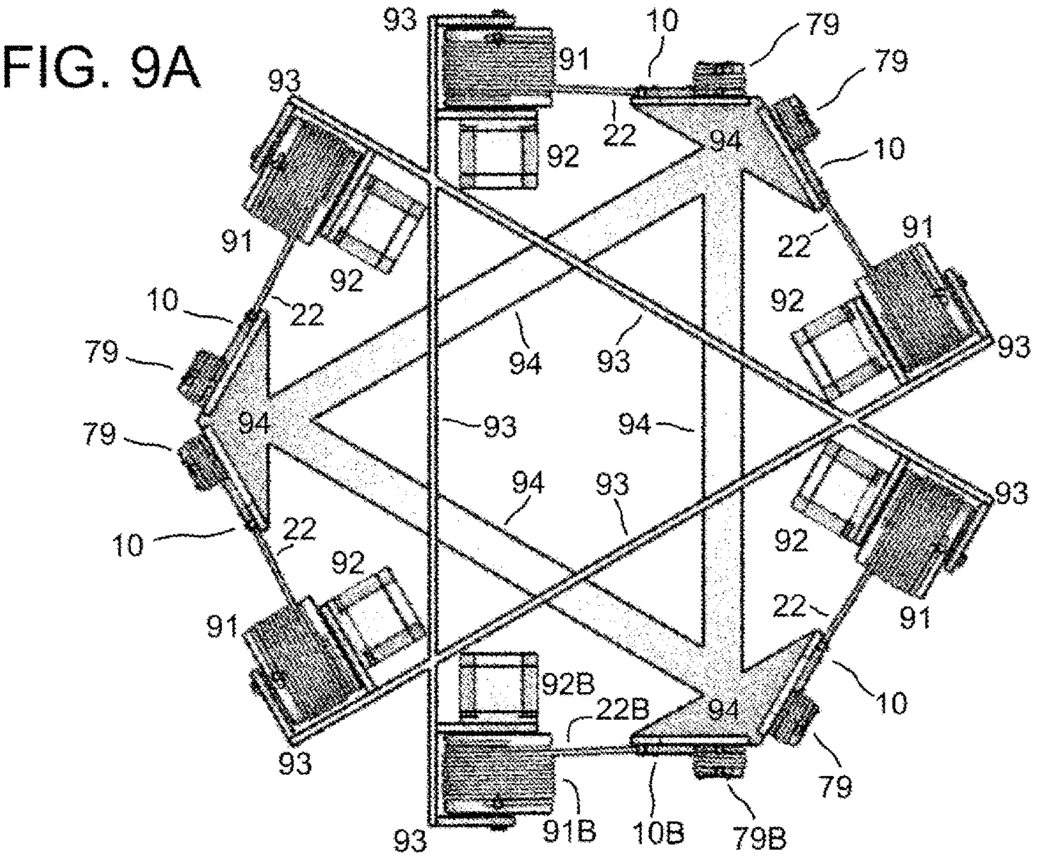
FIG. 9A is a top-down isometric view of a triangular polyhedral truss.
Figure 9B:
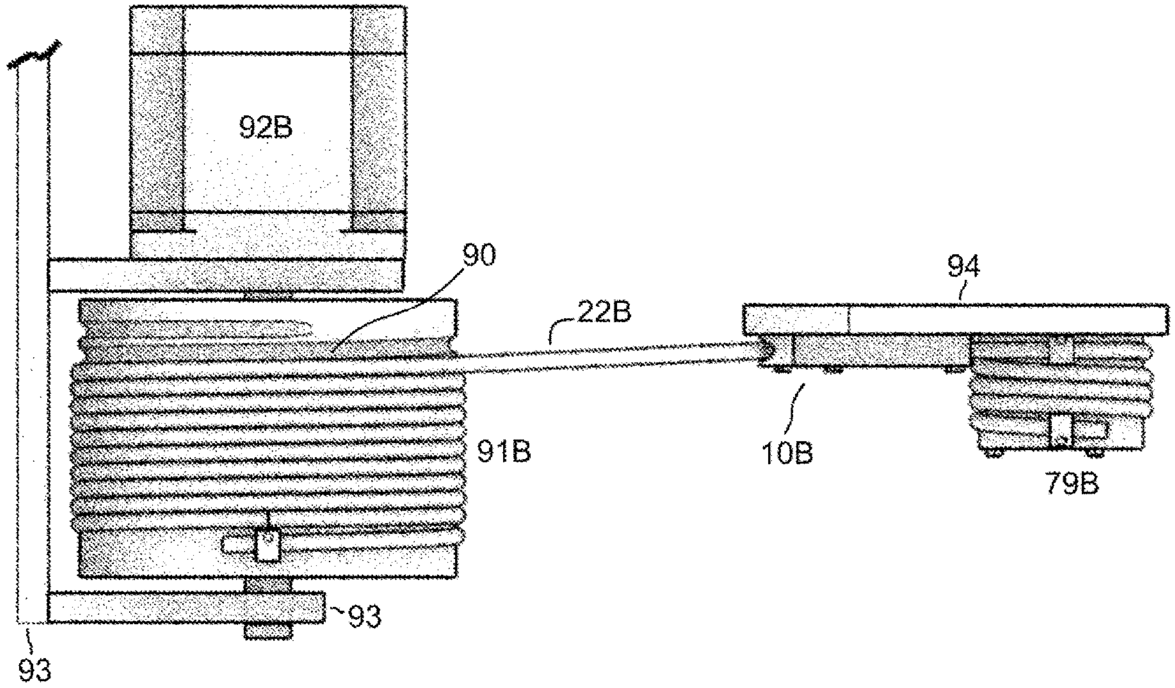
FIG. 9B is a top-down isometric view of a portion of the truss depicted in FIG. 9A.

FIG. 9A is an isometric top-down view of a linear motion trigonal polyhedral truss, with sheaves 91 and attachments 10 scaled to have a 25:1 ratio of tendon diameter to curvature around the sheaves and attachments. Nema style motors 92 are shown at an appropriate scale, with the sheaves 91 and motors 92 supported by frame 93. Platform 94 supports attachments 10 and strain relieving tendon terminations 79 of the type depicted in FIGS. 7C and 7D. FIG. 9B is a higher magnification isometric top-don view of one of the sets of tendons 22 paired sheave attachments, that pair labeled as 91B, 92B, 22B, 10B and 79B. The sheave is shown as having unspooled tendon 22 through one complete revolution, having lowered the platform 94 from the platform to frame closest separation. In this design, that closest separation corresponds to a tendon which is 70 degrees from vertical. At that closest separation, the sheave location 90 is where the tendon has last contact to the sheave, 20 degrees below the sheave top. With the curvature of the attachment 10 aligned with the closest approach sheave contact, and with a sheave diameter 25 times as large as the tendon diameter, the fleet angle on the attachment 10 is an acceptable 1.5 degrees, as shown.

Figure 10:
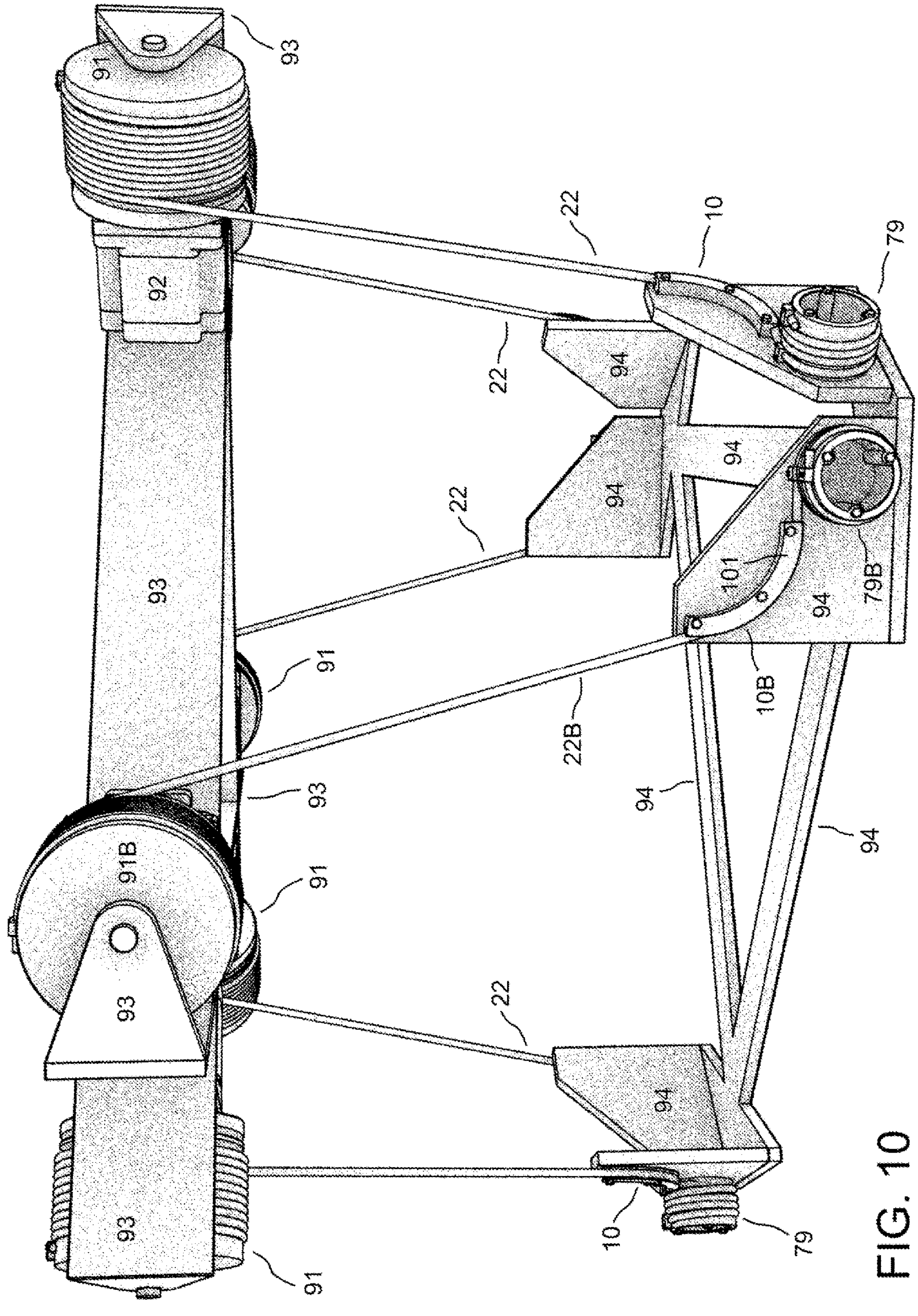
FIG. 10 is a perspective view of the truss depicted in FIG. 9A.

FIG. 10 is a perspective view of the FIG. 9A truss, at the one sheave rotation unspooled height. Location 101 is the location on attachment 10 where the tendon 22 and attachment 10 make contact closest to the sheave 91 when the platform 94 is at closest separation to the frame.

Figure 11:
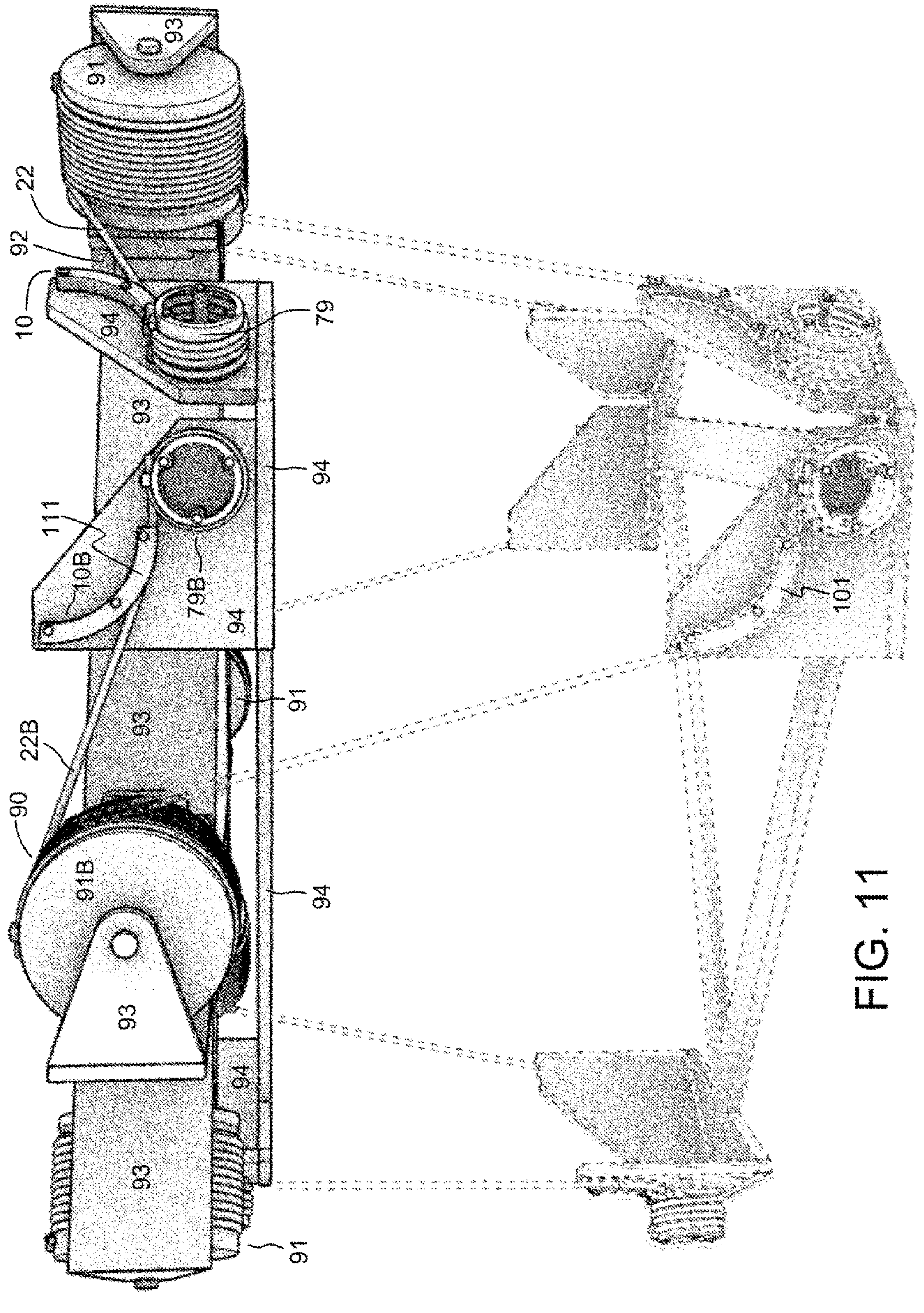
FIG. 11 is a perspective view of the truss depicted in FIG. 9A showing the platform at two heights.

FIG. 11 is a perspective view of the FIG. 9A truss from the same vantage point as FIG. 10, with the platform at closest separation to the frame, and with the FIG. 10 platform location shown in dashed line outlines. Location 111 is the location on attachment 10B where the tendon 22B and attachment 10B make contact closest to the sheave 91B. The triangle formed by locations 90, 101, 111 define the Plane Of Optimal Reeving (POOR). The most preferred orientation of attachment 10B is to have the tendon 22B contact attachment 10B along a curvature within the POOR.

Figure 12A:
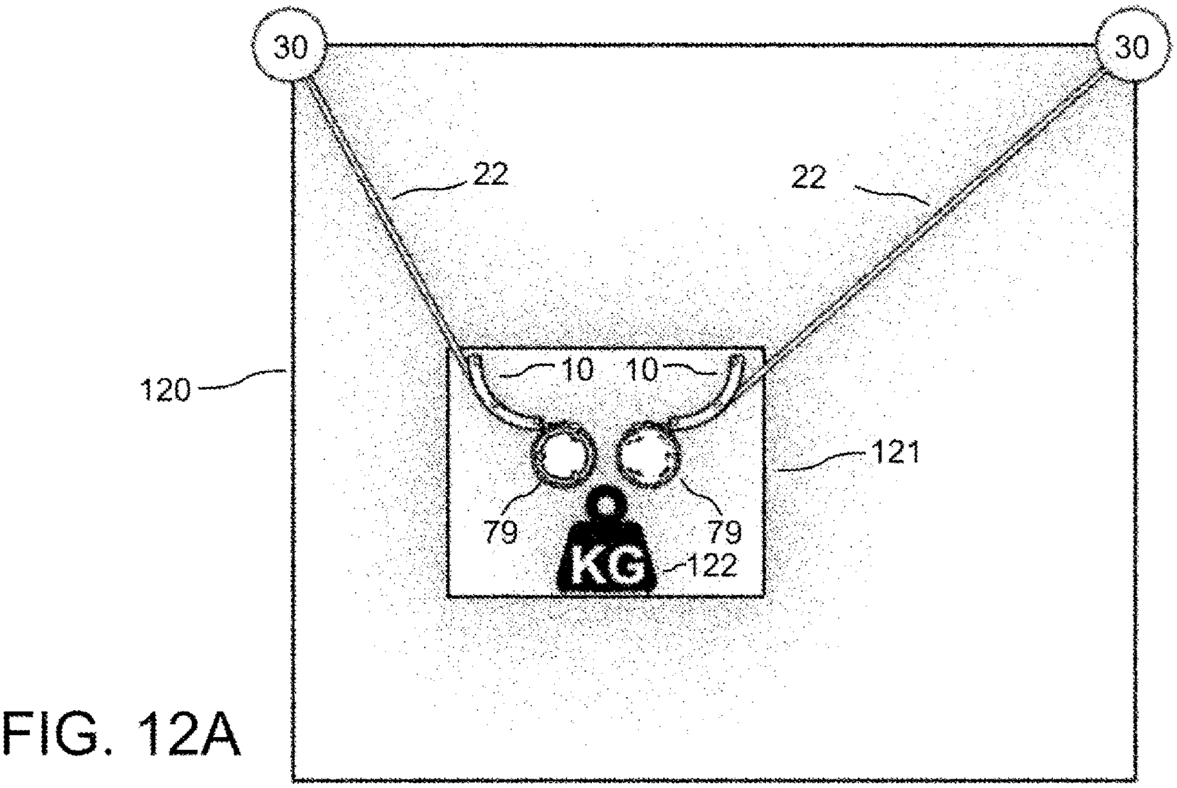
FIG. 12A is an isometric view of a planar motion truss.

FIG. 12A is an isometric view of a two dimensionally restrained planar motion truss viewed perpendicular to restraining planar surface 120, over which platform 121 is held in contact or close proximity by gravity, and over which it moves. The surface 120 may be vertical. The surface 120 may alternately be inclined to the vertical in a direction which causes the platform 121 to press against the surface 121. When inclined, the surface must be no more horizontal than as to allow gravity to pull the platform 121 away from the active units 30. Weight 122 is positioned below the attachments 10 to indicate the center of mass on platform 121 is below the contact between tendons 22 and attachments 10. Platform 121 is suspended on attachments 10 from active tendon span ending units 30 with tendons 22 dead ending on strain relieving tendon termination appliances 79. Each active unit 30 has the tendon 22 contact location for closest platform separation the same distance from the planar surface 120 as the tendon 22 contact to the attachment 10.

Figure 12B:
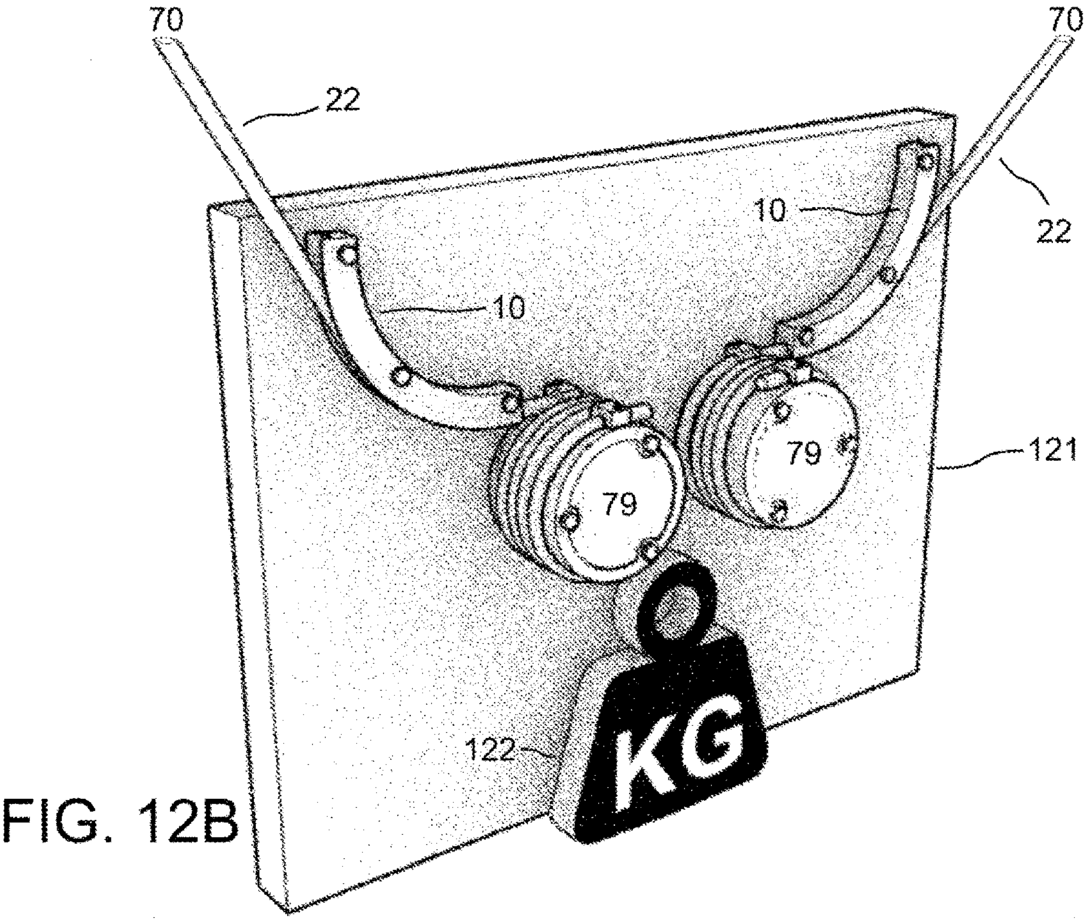
FIG. 12B is a perspective view of the platform in FIG. 12A.

FIG. 12B is a perspective view of the platform 121 and the suspending attachments 10 and strain relieving tendon termination appliances 79.

The appliance depicted in FIGS. 12A and 12B is an exemplary example of why the definition of a tensile truss requires the inclusion of application induced forces in the definition. The appliance depicted has the platform position restrained by being suspended from two and only two tendons, and is further restrained to motions juxtaposed to a planar surface. As such, the assembly conforms to the disclosure truss definition for only those applications wherein any tool carried by the platform induces no torque. The assembly would be a truss for such applications as a pen plotter, an additive application such as a spray painter, or a subtractive application such as a sand blaster.

Figure 13A:
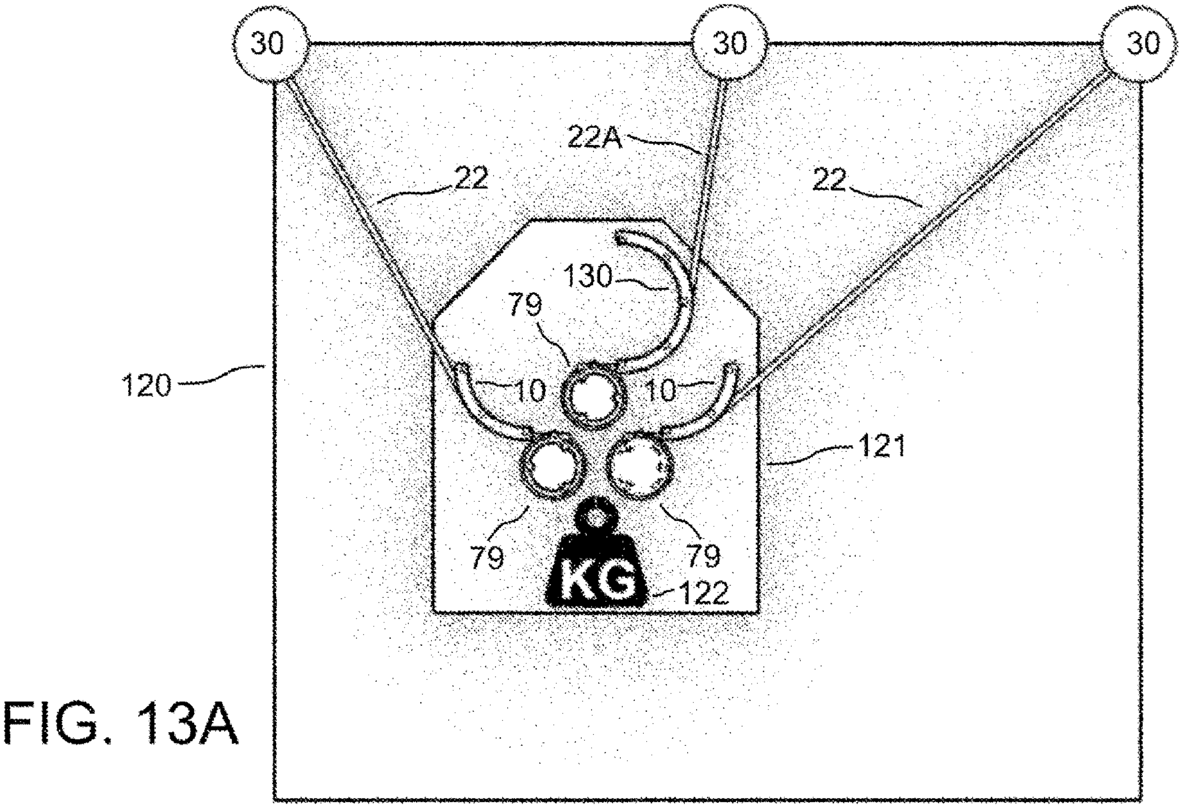
FIGS. 13A and 13B are isometric views of a planar motion truss with an intermediate tendon necessitating an extend angular attachment.
Figure 13B:
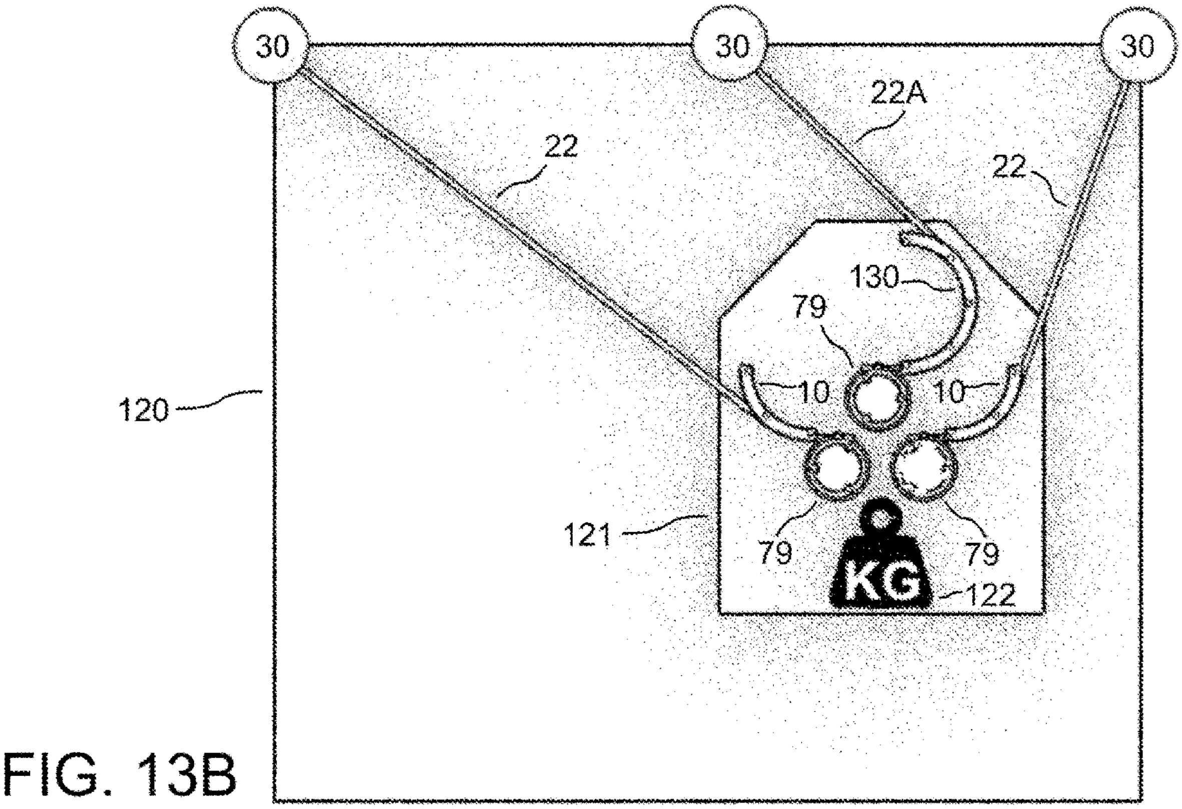

FIGS. 13A and 13B are isometric views of a two dimensionally restrained planar motion truss viewed perpendicular to restraining planar surface 120, over which platform 121 is held in contact or close proximity by gravity, and over which it moves. Active elements 30 and attachments 10 must be at the same distance removed from the planar surface. FIG. 13A shows the platform 121 laterally left of the location wherein cable 22A would be vertical. This places the location where contact between attachment 130 and cable 22A separates as on the lower half of attachment 130.

FIG. 13A shows the platform 121 laterally right of the location wherein cable 22A would be vertical. This places the location where contact between attachment 130 and cable 22A separates as on the upper half of attachment 130. FIGS. 13A and 13B highlight the need for some configurations of two dimensionally restrained planar motion truss to have attachments according to the present invention, which have curvatures extending significantly further than the ¼ of a circle adequate for linear trusses.

The appliance depicted in FIGS. 13A and 13B has the platform position restrained by being suspended from three tendons, and is further restrained to motions juxtaposed to a planar surface. As such, the assembly can conforms to the disclosed truss definition for applications when any tool carried by the platform induces torques smaller than those as can be elastically resisted by the tendon plurality. The assembly could be a truss for a rotary carving tool application such as a dental handpiece, a dremel, a woodcarving router, or metalworking spindle in order of increasing torque. Appliances as have more than three supporting tendons, and are restrained to motions juxtaposed to a planar surface could similarly be trusses as defined.

Figure 14:
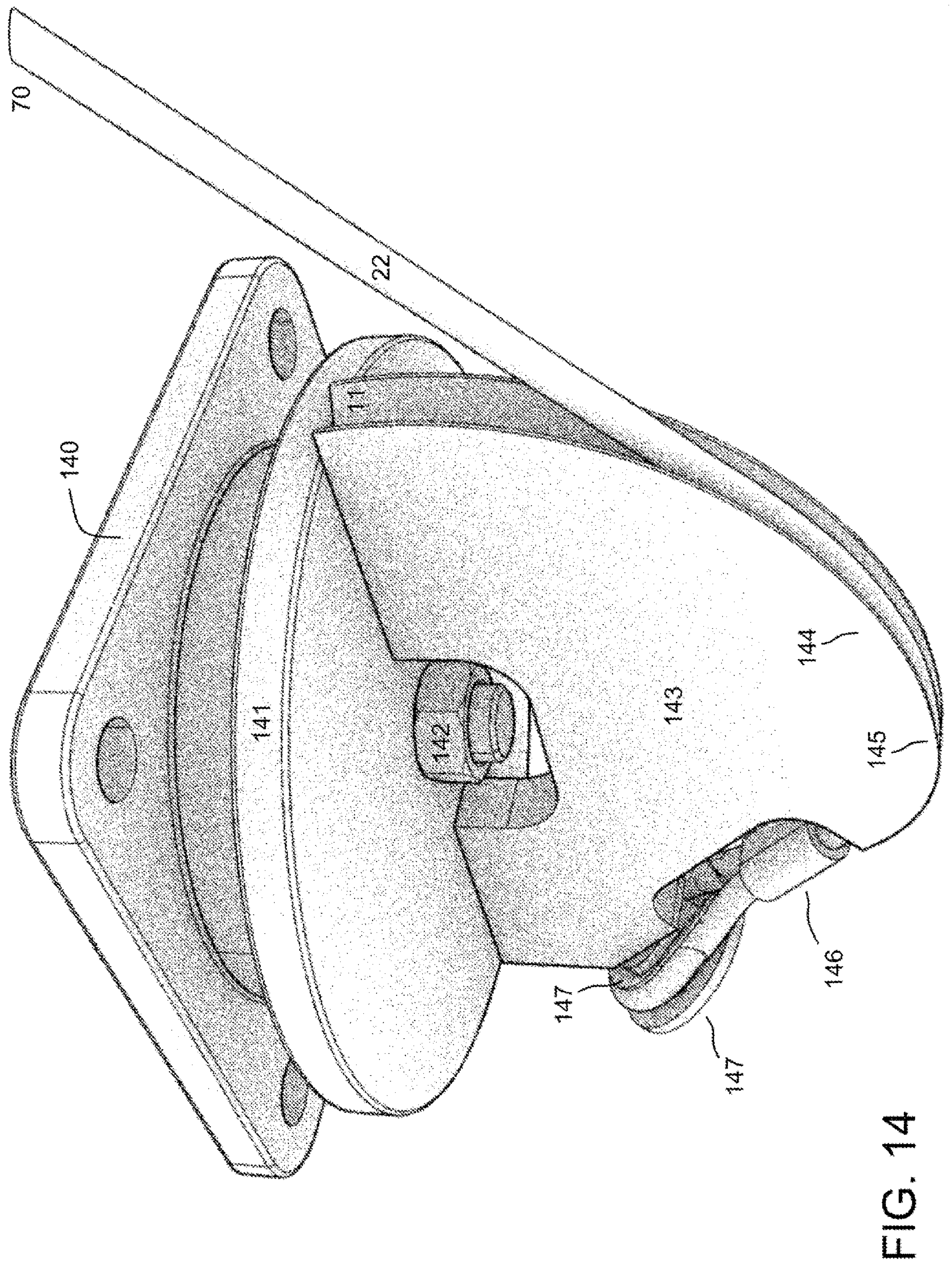
FIG. 14 is a perspective view of a castor mounted attachment usable in a 3D motion truss.

FIG. 14 is a perspective view of an attachment embodiment for a truss in which the platform moves in three dimensions, and can support platforms with up to 6 Degrees Of Freedom (6DOF). This embodiment is similar to a castor wheel, with the wheel replaced by a curved surface over which a tendon can be bent in response to platform (not shown) height changes. An attachment with this 3D motion conformity can also be required for trusses whose motion is two dimensionally restrained, but the active elements 30 are not at the same distance from the restraining surface, measured perpendicular to said surface, as the attachments. One such 2D non-co-planar application is depicted in European Patent EP2578367A1. The adapter plate 140 would be affixed to either the platform or the frame. Rotating flange 141 is attached to the adapter plate 140 by attachment fixture 142. Rotating flange 141 carries attachment 143 and a tendon terminating strain relieving fixture shown here as a wire rope thimble 147 held by shoulder bolt 147 with attendant ferrule 146.

3D motion conformal attachments can also have the rotary motion embodied along the lines of a hinge as opposed to a castor. Such hinged embodiments (not shown) would have rotary support both above and below the curved surface over which a tendon can be bent.

Preferred embodiments for both the castor and hinge type 3D motion conformal attachments have tendon 22 pass through the center of rotation point 145, with the location 144 of the tendon 22 to attachment 143 separation sufficiently away from the center of rotation as to overcome the static coefficient of friction for rotating flange 141. The most preferred embodiments for tendons with relatively round cross sections are those as have the classic wire rope pulley cross section 11.

FIGS. 12A, 12B, 13A, and 13B depict a planar surface as the restraining body against which the motion of the platform 121 is juxtaposed. The restraining body could alternately be a smoothly varying surface such as the unidirectionally curved wall of a liquid containing tank, or a bidirectionally curved hull of a ship. Such non-planar surfaces generally would require a 3D motion conformal embodiment exemplified in FIG. 14.

FIG. 15 is an isometric side view of the castor type embodiment of FIG. 14. The rotary bearing 150 is visible in this view.

FIG. 16 shows the embodiment of FIGS. 14 and 15 with an attached wire mesh tendon alignment fixture 160, which acts as a fairlead. This serves to guide the tendon 22 onto an appropriate portion of the attachment as tension is restored to the truss after a slack tendon condition. Tendon guiding fairlead fixtures may be needed for any of the linear motion, planar motion, or 3D motion trusses if the use cases experience slack tendon conditions. Attachment fairleads can be useful design elements as they can aid in initial truss reeving.

Figure 17:
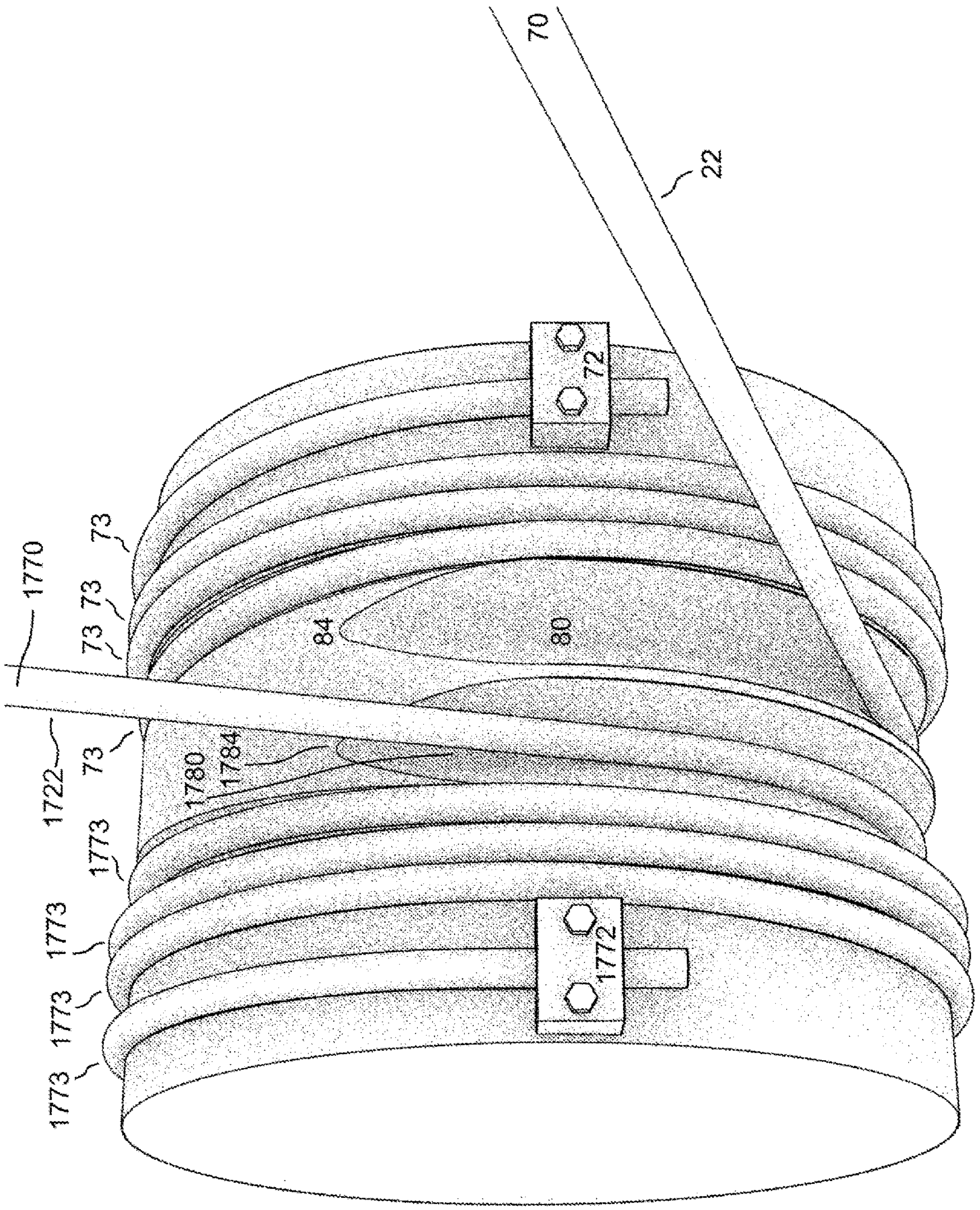
FIG. 17 is a perspective view of a pair of attachments formed on a single body.

FIG. 17 shows an embodiment with two attachments formed on a single fixture body. This arrangement could be employed on a planar motion tensile truss as tendons 22 and 1722 are parallel one to another. The attachment shown on the right side of the body is the same embodiment as shown in FIG. 8, with like numbers between 70 and 84 inclusive designating the same features as in FIG. 8. The left attachment has cable 1722 extending off the image at 1770. Left attachment 1772 has the same function as clamp 72. Left attachment 1773 has the same function as strain relieving wrap 73. Left attachment 1780 has the same function as contact variance extreme 80. Left attachment 1784 has the same function as groove termination 84.

Although illustrative embodiments of the present invention have been described in detail with reference to the accompanying drawings, it is to be understood that the invention is not limited to those precise embodiments. It will be understood that the particular method and means embodying the invention are shown by way of illustration only and not as a limitation of the invention. The principles and features of this invention may be employed in varied and numerous embodiments without departing from the scope of the invention.

The invention claimed is:

1. A tensile truss assembly comprising:

a frame;

a plurality of tendons;

a plurality of sheaves installed on the frame, the plurality of sheaves for attaching the plurality of tendons to the frame;

a platform moveable relative to the frame;

a plurality of tendon attachments fixed at locations on the platform, the plurality of tendon attachments for attaching the tendons to the platform;

wherein each sheave and each tendon attachment is directly connected to exactly one tendon, forming a plurality of pairs, each pair comprising a sheave and a respective tendon attachment, wherein the sheave and respective tendon attachment of each pair are connected via a single tendon;

wherein each sheave is configured to selectively:

extend a respective tendon length, hold static the respective tendon length, and reduce the respective tendon length;

wherein extending or reducing a respective tendon length moves or reorients the platform relative to the frame;

wherein each of the tendon attachments is fixed rotationally relative to the platform, and comprises a curved surface for guiding the respective tendon;

wherein the respective tendon is configured to engage a longer extent of the curved surface in a first position, and to engage a shorter extent of the curved surface in a second position;

wherein the respective tendon is configured to disengage the tendon attachment within the arc length of the curve.

2. The tensile truss assembly of claim 1, wherein the arc length of the curve is greater than 90 degrees.

3. The tensile truss assembly of claim 1, wherein at least one of the tendon attachments has a groove in the curved surface for receiving the respective tendon therein.

4. The tensile truss assembly of claim 3, further comprising a plurality of terminations which fix an end of the tendons to the platform.

5. The tensile truss assembly of claim 4, further comprising at least one fixture body which has a plurality of the terminations thereupon.

6. The tensile truss assembly of claim 4, further comprising at least one fairlead situated between one of the tendon attachments and one of the terminations, the at least one fairlead for guiding one of the tendons onto the groove after a slack tendon condition.

7. A planar motion tensile truss assembly comprising:

a frame;

a plurality of tendons;

a plurality of sheaves installed on the frame, the plurality of sheaves for attaching the plurality of tendons to the frame;

a platform moveable relative to the frame;

a plurality of tendon attachments fixed at locations on the platform, the plurality of tendon attachments for attaching the tendons to the platform;

wherein each sheave and each tendon attachment is directly connected to exactly one tendon, forming a plurality of pairs, each pair comprising a sheave and a respective tendon attachment, wherein the sheave and respective tendon attachment of each pair are connected via a single tendon;

wherein each sheave is configured to selectively extend a respective tendon length, hold static the respective tendon length, and reduce the respective tendon length;

wherein extending or reducing a respective tendon length moves the platform relative to the frame;

wherein each of the tendon attachments is fixed rotationally relative to the platform, and comprises a curved surface for guiding the respective tendon;

wherein the respective tendon is configured to engage a longer extent of the curved surface in a first position, and to engage a shorter extent of the curved surface in a second position;

wherein the respective tendon is configured to disengage the tendon attachment within the arc length of the curve;

a restraining body configured to guide the platform in planar motion, or to guide the platform in planar reorientation.

8. The planar motion tensile truss assembly of claim 7, wherein the arc length of the curve is greater than 90 degrees.

9. The tensile truss assembly of claim 7, wherein at least one of the tendon attachments has a groove in the curved surface for receiving the respective tendon therein.

10. The planar motion tensile truss assembly of claim 9, further comprising a plurality of terminations which fix an end of the tendons to the platform.

11. The planar motion tensile truss assembly of claim 10, further comprising at least one fixture body which has a plurality of the terminations thereupon.

12. The planar motion tensile truss assembly of claim 10, further comprising at least one fairlead situated between one of the tendon attachments and one of the terminations, the at least one fairlead for guiding one of the tendons onto the groove after a slack tendon condition.

13. A tensile truss assembly comprising:

a frame;

a plurality of tendons;

a plurality of sheaves installed on the frame, the plurality of sheaves for attaching the plurality of tendons to the frame;

a platform moveable relative to the frame;

a plurality of tendon attachments fixed at locations on the platform, the plurality of tendon attachments for attaching the tendons to the platform;

wherein each sheave and each tendon attachment is directly connected to exactly one tendon, forming a plurality of pairs, each pair comprising a sheave and a respective tendon attachment, wherein the sheave and respective tendon attachment of each pair are connected via a single tendon;

wherein each sheave is configured to selectively extend a respective tendon length, hold static the respective tendon length, and reduce the respective tendon length;

wherein extending or reducing a respective tendon length moves the platform relative to the frame;

wherein each of the tendon attachments is fixed rotationally relative to the platform, and comprises a curved surface for guiding the respective tendon;

wherein the respective tendon is configured to engage a longer extent of the curved surface in a first position, and to engage a shorter extent of the curved surface in a second position;

wherein the respective tendon is configured to disengage the tendon attachment within the arc length of the curve;

the sheaves configured to hold the platform:

in a static position and static orientation relative to the frame, or to cause movement of the platform relative to the frame within a three dimensional volume with constant orientation, or to cause orientation change of the platform relative to the frame, or to cause both movement within a three dimensional volume and orientation change of the platform relative to the frame.

14. The tensile truss assembly of claim 13, wherein the arc length of the curve is greater than 90 degrees.

15. The tensile truss assembly of claim 13, wherein at least one of the tendon attachments has a groove in the curved surface for receiving the respective tendon therein.

16. The planar motion tensile truss assembly of claim 15, further comprising a plurality of terminations which fix an end of the tendons to the platform.

17. The planar motion tensile truss assembly of claim 16, further comprising at least one fixture body which has a plurality of the terminations thereupon.

18. The planar motion tensile truss assembly of claim 17, further comprising at least one fairlead situated between one of the tendon attachments and one of the terminations, the at least one fairlead for guiding one of the tendons onto the groove after a slack tendon condition.

* * * * *